(12) United States Patent
Kawachiya et al.

(10) Patent No.: US 7,793,023 B2
(45) Date of Patent: *Sep. 7, 2010

(54) EXCLUSION CONTROL

(75) Inventors: Kiyokuni Kawachiya, Kanagawa (JP); Akira Koseki, Sagamihara (JP); Tamiya Onodera, Ageo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/062,844

(22) Filed: Apr. 4, 2008

(65) Prior Publication Data

US 2008/0243887 A1    Oct. 2, 2008

(51) Int. Cl.
*G06F 13/14* (2006.01)
*G06F 13/00* (2006.01)
*G06F 12/00* (2006.01)
*G06F 7/00* (2006.01)
*G06F 13/28* (2006.01)
*G06F 9/46* (2006.01)

(52) U.S. Cl. .................. 710/244; 710/100; 710/200; 707/100; 711/145; 718/104

(58) Field of Classification Search ............ 710/100, 710/200, 244; 707/100; 711/145; 718/104
See application file for complete search history.

(56) References Cited

U.S. PATENT DOCUMENTS

| | | | |
|---|---|---|---|
| 5,291,581 A | 3/1994 | Cutler et al. | |
| 5,615,374 A | 3/1997 | Sadoi et al. | |
| 5,644,783 A | 7/1997 | Kochiya et al. | |
| 5,761,731 A | 6/1998 | Van Doren et al. | |
| 5,826,081 A | 10/1998 | Zolnowsky | |
| 5,864,699 A | 1/1999 | Merryman | |
| 6,286,070 B1 | 9/2001 | Ohara | |
| 6,697,834 B1 | 2/2004 | Dice | |
| 6,697,935 B1 | 2/2004 | Borkenhagen et al. | |
| 6,745,258 B1 | 6/2004 | Pellegrino et al. | |

(Continued)

FOREIGN PATENT DOCUMENTS

JP        07-129452        5/1995

(Continued)

OTHER PUBLICATIONS

Onodera et al., "A Study of Locking Objects with Bimodal Fields," IBM Research, Tokyo Research Laboratory, 1999.
Kawachiya et al., "Lock Reservation: Java Locks Can Mostly Do Without Atomic Operations," IBM Research, Tokyo Research Laboratory, 2002.

*Primary Examiner*—Mark Rinehart
*Assistant Examiner*—Christopher A Daley
(74) *Attorney, Agent, or Firm*—Jon A. Gibbons; Fleit Gibbons Gutman Bongini & Bianco PL

(57) ABSTRACT

An exclusion controller which allows an information processing unit to acquire a contended resource to the exclusion of the other information processing units includes a plurality of non-prioritized information processing units mutually exclusively acquiring a non-prioritized exclusion right, which indicates a candidate for acquiring the contended resource, by a first process. The exclusion controller further includes a prioritized information processing unit acquiring the contended resource by a second process, which requires a shorter processing time than the first process, to the exclusion of the non-prioritized information processing unit having acquired the non-prioritized exclusion right.

16 Claims, 17 Drawing Sheets

U.S. PATENT DOCUMENTS

| | | |
|---|---|---|
| 6,757,795 B2 | 6/2004 | Barri et al. |
| 6,986,005 B2 | 1/2006 | Vo |
| 7,047,245 B2 | 5/2006 | Jones |
| 7,111,298 B1 | 9/2006 | Michael et al. |
| 7,165,150 B2 | 1/2007 | Alverson et al. |
| 2002/0046334 A1 | 4/2002 | Wah Chan et al. |

FOREIGN PATENT DOCUMENTS

| | | |
|---|---|---|
| JP | 2000-076086 | 3/2000 |
| WO | WO00/50993 | 8/2000 |

100

| Prioritized information processing unit identification information (110) | Prioritized exclusion right information (120) | Non-Prioritized exclusion right information (130) |
|---|---|---|
| Anonymous state | Unlocked | Nobody |

| Prioritized information processing unit identification information (110) | Prioritized exclusion right information (120) | Non-Prioritized exclusion right information (130) |
|---|---|---|
| ID 1 | Unlocked | Nobody |

| Prioritized information processing unit identification information (110) | Prioritized exclusion right information (120) | Non-Prioritized exclusion right information (130) |
|---|---|---|
| ID 1 | Locked | Nobody |

| Prioritized information processing unit identification information /110 | Prioritized exclusion right information /120 | Non-Prioritized exclusion right information /130 |
|---|---|---|
| ID 1 | Unlocked | ID 2 |

| Prioritized information processing unit identification information /110 | Prioritized exclusion right information /120 | Non-Prioritized exclusion right information /130 |
|---|---|---|
| ID 1 | Locked | ID 2 |

FIG. 2E

| Area usage type | Exclusion right | Information processing unit identification information |
|---|---|---|
| Prioritized information processing unit | Unlocked | ID 1 |

FIG. 8A

| Area usage type | Exclusion right | Information processing unit identification information |
|---|---|---|
| Prioritized information processing unit | Locked | ID 1 |

FIG. 8B

| Area usage type | Exclusion right | Information processing unit identification information |
|---|---|---|
| Non-Prioritized exclusion right | Locked | ID 2 |

FIG. 8C

| Area usage type | Exclusion right | Information processing unit identification information |
|---|---|---|
| Non-Prioritized exclusion right | Unlocked | Nobody |

FIG. 8D

EXCLUSION CONTROL

FIELD OF INVENTION

The present invention relates to an exclusion controller, an exclusion control method, a program, and a recording medium. In particular, the present invention relates to an exclusion controller, an exclusion control method, a program, and a recording medium, which give priority for acquiring a contended resource to a specific information processing unit.

BACKGROUND OF THE INVENTION

In recent years, multiprocessors and multithreads are used as technologies for causing a computer to execute a plurality of tasks in parallel and for causing a plurality of processors to cooperatively execute a task at a high speed. In these technologies, a plurality of information processing units, such as processors or threads, share a contended resource such as a memory or an input/output device.

Heretofore, a method for enabling high-speed acquisition and release of a contended resource by changing an algorithm used for arbitration of the contention depending on whether the degree of contention is relatively low or high when the arbitration for the contended resource is performed, has been proposed (refer to nonpatent literature 1). According to the method disclosed in nonpatent literature 1, a contended resource, in particular, can be acquired and released at a high speed compared to other methods.

(Nonpatent Literature 1)

Tamiya Onodera and Kiyokuni Kawachiya: "A Study of Locking Objects with Bimodal Fields," in Proceedings of OOPSLA '99.

However, there are cases where only a specific information processing unit among a plurality of information processing units frequently acquires and releases a contended resource. According to known technologies, even in such cases, the specific information processing unit needs to execute a process while operating to the exclusion of the other information processing units in the acquisition of the contended resource. This has made it difficult to improve a processing speed.

SUMMARY OF THE INVENTION

Accordingly, the present invention provides an exclusion controller, an exclusion control method, a program, and a recording medium, which solve the above-described problem. Specifically, a first aspect of the present invention provides an exclusion controller which allows an information processing unit to acquire a contended resource to the exclusion of other information processing units. In an example embodiment, the exclusion controller includes: a plurality of non-prioritized information processing units mutually exclusively acquiring a non-prioritized exclusion right, which indicates a candidate for acquiring the contended resource, by a first process; and a prioritized information processing unit acquiring the contended resource by a second process, which requires a shorter processing time than the first process, to the exclusion of the non-prioritized information processing unit having acquired the non-prioritized exclusion right.

A second aspect of the present invention provides an exclusion controller which allows any one of a plurality of threads capable of acquiring an identical contended resource to acquire the contended resource to the exclusion of the other threads different from the relevant thread. The exclusion controller includes: an execution state acquisition/notification unit for acquiring execution location information indicating an execution location of a program in a first thread of the threads and for notifying a second thread different from the first thread of the execution location information; and an execution state setting unit for allowing the second thread to execute a process for setting, in the first thread, execution location information indicating that the contended resource is not being acquired if the acquired execution location information indicates that the contended resource is being acquired. Further, the second aspect of the present invention provides an exclusion control method, a program for realizing the method, and a recording medium having the program recorded thereon.

BRIEF DESCRIPTION OF THE DRAWINGS

For a more complete understanding of the present invention and the advantages thereof, reference is now made to the following description taken in conjunction with the accompanying drawings, in which:

FIG. 2 is a view showing details of a flat lock storage unit 100 in the first embodiment;

FIG. 8 is a view showing details of a flat lock storage unit 100 in the modified example of the first embodiment;

DETAILED DESCRIPTION OF THE INVENTION

The present invention provides an exclusion controller, an exclusion control method, a program, and a recording medium. In an embodiment, the present invention provides an exclusion controller which allows an information processing unit to acquire a contended resource to the exclusion of other information processing units. The exclusion controller includes: a plurality of non-prioritized information processing units mutually exclusively acquiring a non-prioritized exclusion right, which indicates a candidate for acquiring the contended resource, by a first process; and a prioritized information processing unit acquiring the contended resource by a second process, which requires a shorter processing time than the first process, to the exclusion of the non-prioritized information processing unit having acquired the non-prioritized exclusion right. Thus, the present invention provides an exclusion control method, a program for realizing the method, and a recording medium having the program recorded thereon.

Moreover, the present invention provides an exclusion controller which allows any one of a plurality of threads capable of acquiring an identical contended resource to acquire the contended resource to the exclusion of the other threads different from the relevant thread. The exclusion controller includes: an execution state acquisition/notification unit for acquiring execution location information indicating an execution location of a program in a first thread of the threads and for notifying a second thread different from the first thread of the execution location information; and an execution state setting unit for allowing the second thread to execute a process for setting, in the first thread, execution location information indicating that the contended resource is not being acquired if the acquired execution location information indicates that the contended resource is being acquired. Further, the second aspect of the present invention provides an exclusion control method, a program for realizing the method, and a recording medium having the program recorded thereon.

Hereinafter, the present invention will be described through particular example embodiments thereof. However, the embodiments below are not intended to limit the invention according to the appended claims. Moreover, all combinations of features described in the embodiments are not always necessary for solving means of the invention.

First Embodiment

Figure 1:
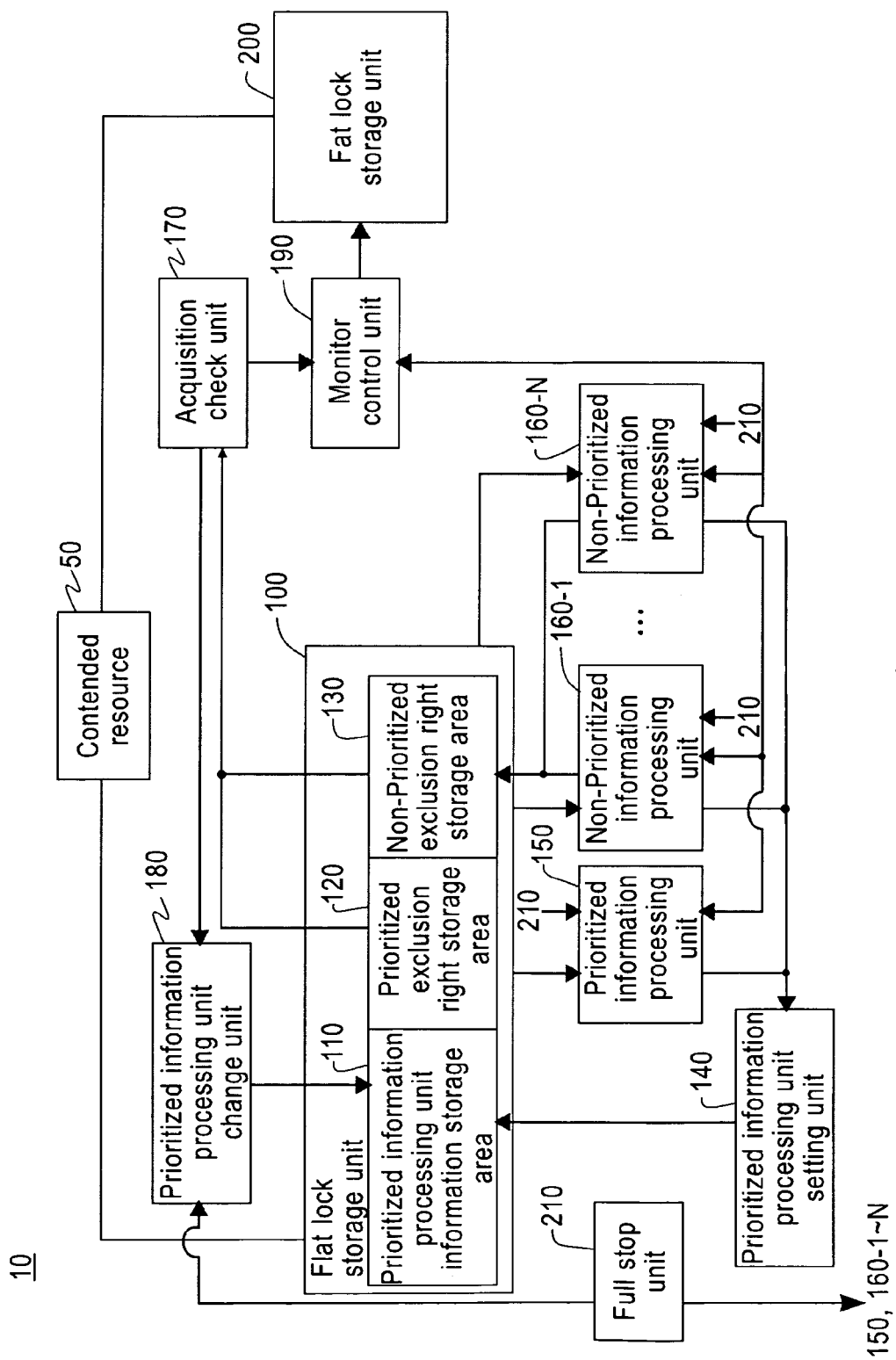
FIG. 1 is a function block diagram of an exclusion controller 10 in a first embodiment.

FIG. 1 shows a function block diagram of an exclusion controller 10 in a first embodiment. The exclusion controller 10 has an object to arbitrate the acquisition of a contended resource 50 by allowing any one of a plurality of information processing units operating parallel to one another, for example, a prioritized information processing unit 150 and non-prioritized information processing units 160-1 to 160-N, to acquire the contended resource 50 to the exclusion of the other information processing units.

The exclusion controller 10 comprises the contended resource 50 to be acquired by any one of the plurality of information processing units, a flat lock storage unit 100 used when the degree of contention for the contended resource 50 is relatively low, a prioritized information processing unit setting unit 140 for setting one of the plurality of information processing units as the prioritized information processing unit 150, the prioritized information processing unit 150 given priority in acquisition of the contended resource 50, non-prioritized information processing units 160-1 to 160-N, an acquisition check unit 170 for checking the degree of contention for the contended resource, a prioritized information processing unit change unit 180 for changing the prioritized information processing unit 150, a monitor control unit 190 used when the degree of contention for the contended resource 50 is relatively high, a fat lock storage unit 200, and a full stop unit 210 for temporarily stopping the operations of all the information processing units.

Each of the non-prioritized information processing units 160-1 to 160-N executes, as an example of a first process, a process for writing on the flat lock storage unit 100 to the exclusion of the other non-prioritized information processing units, thereby acquiring and releasing a non-prioritized exclusion right, which is a right to be a candidate for acquiring the contended resource 50. For example, each of the non-prioritized information processing units 160-1 to 160-N executes exclusive writes by a compare-and-swap instruction requiring a relatively long processing time. On the other hand, the prioritized information processing unit 150 set by the prioritized information processing unit setting unit 140 executes, as an example of a second process requiring a shorter processing time than the first process, a process for writing on the flat lock storage unit 100 by, for example, a normal write instruction, thereby acquiring and releasing the contended resource 50. The exclusion controller 10 allows any one of the prioritized information processing unit 150 and the non-prioritized information processing unit 160 which has acquired the non-prioritized exclusion right, to acquire the contended resource 50.

As described above, the exclusion controller 10 can allow the prioritized information processing unit 150 to acquire the contended resource 50 by using the second process faster than the first process. Accordingly, the exclusion controller 10 can allow the prioritized information processing unit 150 to acquire the contended resource 50 faster than the non-prioritized information processing unit 160. For example, when it is previously predicted that the prioritized information processing unit 150 has a higher frequency of acquiring the contended resource 50 than the other information processing units, the exclusion controller 10 can execute an arbitration process regarding the acquisition of the contended resource 50 at a high speed.

The contended resource 50 is a resource to be exclusively acquired by any one of the prioritized information processing unit 150 and the non-prioritized information processing units 160-1 to 160-N, which asynchronously operate. For example, the contended resource 50 is a memory area which is shared by the prioritized information processing unit 150 and the non-prioritized information processing units 160-1 to 160-N and stores the total number of times that the resource has been acquired. The necessity of exclusively accessing this memory area will be described below.

The memory area can store the total number of times that the contended resource 50 has been acquired, in the case where the following increment process is executed when any one of the prioritized information processing unit 150 and the non-prioritized information processing units 160-1 to 160-N has acquired the contended resource: a counter is read from the memory area, a new value is generated by adding one to the read counter, and the new value is written to the memory area.

However, if another information processing unit which has not acquired the contended resource is allowed to execute an increment process parallel to the above-described increment process, there may be cases where the memory area stores a value less than the total number of times that the contended resource 50 has been acquired. Specifically, if the another information processing unit initiates and terminates an increment process after the information processing unit, which has acquired the contended resource, has read the counter and before the information processing unit writes a new value, the result written by the another information processing unit is overwritten and destroyed by the new value generated by the information processing unit having acquired the contended resource. Therefore, in order to correctly keep the total number of times that the contended resource 50 has been acquired, the contended resource 50 needs to be exclusively acquired by each of the plurality of information processing units.

Incidentally, instead of a memory area as described above, the contended resource 50 may be any one of the following: an input/output device provided in a computer or the like, a communication channel connected to a communication device, and an instruction sequence to be exclusively executed. In other words, the contended resource 50 may be a device or the like which causes problems in operations when the device concurrently receives directions from a plurality of information processing units.

The flat lock storage unit 100 is provided so as to correspond to the contended source 50, and stores information indicating which information processing unit has acquired the contended resource 50. The flat lock storage unit 100 has a prioritized information processing unit information storage area 110, a prioritized exclusion right storage area 120, and a non-prioritized exclusion right storage area 130.

The prioritized information processing unit information storage area 110 stores prioritized information processing unit identification information indicating which information processing unit is the prioritized information processing unit 150. For example, the prioritized information processing unit information storage area 110 stores either anonymous state information indicating that any of the information processing units is not the prioritized information processing unit 150, or identification information for identifying the prioritized information processing unit 150.

The prioritized exclusion right storage area 120 stores "locked" as prioritized exclusion right information indicating that the prioritized information processing unit 150 is trying to acquire the contended resource 50. On the other hand, when the prioritized information processing unit 150 is not trying to acquire the contended resource 50, the prioritized exclusion right storage area 120 stores "unlocked."

The non-prioritized exclusion right storage area 130 stores, as non-prioritized exclusion right information identifying which of the non-prioritized information processing units 160-1 to 160-N has acquired the non-prioritized exclusion right, identification information for identifying the non-prioritized information processing unit 160. On the other hand, when any of the non-prioritized information processing units 160-1 to 160-N has not acquired the non-prioritized exclusion right, the non-prioritized exclusion right storage area 130 stores "nobody."

When the prioritized information processing unit setting unit 140 receives, from any one of the prioritized information processing unit 150 and the non-prioritized information processing units 160-1 to 160-N, directions to set the information processing unit as the prioritized information processing unit, the prioritized information processing unit setting unit 140 executes the following process to the exclusion of the other information processing units except the sender of the directions. If identification information for identifying the prioritized information processing unit 150 is not stored in the prioritized information processing unit information storage area 110, that is, if anonymous state information is stored therein, the prioritized information processing unit setting unit 140 stores, in the prioritized information processing unit information storage area 110, identification information for identifying the information processing unit which has given the directions to the prioritized information processing unit setting unit 140.

The non-prioritized information processing units 160-1 to 160-N are, for example, units of processing which are managed by an operating system or a language processor and may operate asynchronously, specifically, threads or processes. As another example, each of the non-prioritized information processing units 160-1 to 160-N may be a central processor of a computer.

When the non-prioritized information processing units 160-1 to 160-N receive directions to acquire the contended resource 50 from a program or the like created by a user, the non-prioritized information processing units 160-1 to 160-N mutually exclusively acquire the non-prioritized exclusion right, which indicates a candidate for acquiring the contended resource 50, by using the first process. For example, the non-prioritized information processing unit 160-1 executes the following process as the first process to the exclusion of the non-prioritized information processing units 160-2 to 160-N. If non-prioritized exclusion right information has not yet stored in the non-prioritized exclusion right storage area 130, that is, if "nobody" is stored therein, the non-prioritized information processing unit 160-1 writes non-prioritized exclusion right information indicating that the non-prioritized information processing unit 160-1 has acquired a non-prioritized exclusion right, in the non-prioritized exclusion right storage area 130.

To be more specific, the non-prioritized information processing unit 160-1 executes the first process by using an indivisible instruction (atomic instruction), such as a compare-and-swap instruction, which exclusively executes a read, a check, and a write without being interrupted by processes of the other information processing units. Instead of this, the non-prioritized information processing unit 160-1 may execute the first process by using any one of the following: a test-and-set instruction, a lock instruction which locks a bus used for writing on a memory, and an LL instruction or an SC instruction which is provided in, for example, a MIPS (trademark) processor and checks whether other information processing unit has written to a memory having stored a read value.

Moreover, if an anonymous state is stored in the prioritized information processing unit information storage area 110, the non-prioritized information processing unit 160-1 transmits directions to set the non-prioritized information processing unit 160-1 as the prioritized information processing unit, to the prioritized information processing unit setting unit 140. Operations of the non-prioritized information processing units 160-2 to 160-N are almost the same as those of the non-prioritized information processing unit 160-1. Therefore, a description thereof will be omitted.

Further, when the non-prioritized information processing unit 160-1 receives directions to release the contended resource 50, from a program or the like created by a user, the non-prioritized information processing unit 160-1 writes "nobody" in the non-prioritized exclusion right storage area 130, thereby releasing the contended resource 50. Note that, in transition to a fat state in which the contended resource 50 is acquired in a monitor mode to be described later, the non-prioritized information processing unit 160-1 once acquires the contended resource 50 by using the monitor mode and then executes a process for releasing the contended resource 50 as needed.

Moreover, in the fat state, the non-prioritized information processing unit 160-1 acquires the contended resource 50 by transmitting directions to acquire the contended resource 50 to the monitor control unit 190. Similarly, in the fat state, the non-prioritized information processing unit 160-1 releases the contended resource 50 by transmitting directions to release the contended resource 50 to the monitor control unit 190.

Similar to the non-prioritized information processing units 160-1 to 160-N, the prioritized information processing unit 150 is a unit of processing, such as a thread or a process. Realized examples of the prioritized information processing unit 150 are almost the same as those of the non-prioritized information processing unit 160. Therefore, a description thereof will be omitted.

The prioritized information processing unit 150 acquires the contended resource 50 by executing, as described below, the second process requiring a shorter processing time than the first process, to the exclusion of the non-prioritized information processing unit 160 having acquired the non-prioritized exclusion right. First, the prioritized information processing unit 150 stores "locked" in the prioritized exclusion right storage area 120. Next, the prioritized information processing unit 150 reads the non-prioritized exclusion right information stored in the non-prioritized exclusion right storage area 130. If non-prioritized exclusion right information has been already stored therein, that is, if any one of the non-prioritized information processing units 160-1 to 160-N has already acquired the non-prioritized exclusion right, the prioritized information processing unit 150 removes "locked" from the prioritized exclusion right storage area 120 to store "unlocked" therein, and then executes another process (e.g. a process for retrying to acquire the contended resource 50). On the other hand, if non-prioritized exclusion right information has not yet been stored, that is, if any of the non-prioritized information processing units 160-1 to 160-N has not acquired the non-prioritized exclusion right, the prioritized information processing unit 150 acquires the contended resource 50 to execute a process using the contended resource 50.

When the prioritized information processing unit 150 receives directions to release the contended resource 50, from a program or the like created by a user, the prioritized information processing unit 150 releases the contended resource 50 by removing "locked" from the prioritized exclusion right storage area 120 to store "unlocked" therein. Note that a process for releasing the contended resource 50 in the fat state is almost the same as that of the non-prioritized information processing unit 160-1 and therefore a description thereof will be omitted.

The acquisition check unit 170 checks whether the acquisition of the contended resource 50 has failed, based on the first or second process executed by an information processing unit. If "locked" is stored in the prioritized exclusion right storage area 120, the acquisition check unit 170 checks whether the non-prioritized exclusion right is stored in the non-prioritized exclusion right storage area 130. If the acquisition check unit 170 checks that the non-prioritized exclusion right is stored in the non-prioritized exclusion right storage area 130, the acquisition check unit 170 checks that the acquisition of the contended resource 50 by the first process has failed. The acquisition check unit 170 then transmits information indicating that the acquisition of the contended resource 50 has failed, to the prioritized information processing unit change unit 180 and the monitor control unit 190.

When the prioritized information processing unit change unit 180 receives the information indicating that the acquisition of the contended resource 50 has failed from the acquisition check unit 170, the prioritized information processing unit change unit 180 stores anonymous state information in the prioritized information processing unit information storage area 110, thereby changing the prioritized information processing unit 150 into the non-prioritized information processing unit 160. Moreover, when the prioritized information processing unit change unit 180 receives directions to change the prioritized information processing unit, from the full stop unit 210, the prioritized information processing unit change unit 180 specifies the information processing unit having acquired the contended resource 50 by referring to the flat lock storage unit 100. Then, the prioritized information processing unit change unit 180 writes, on the flat lock storage unit 100, information indicating that the specified information processing unit is set as the prioritized information processing unit, thereby changing the specified information processing unit into the prioritized information processing unit. The prioritized information processing unit change unit 180 determines the information processing unit to be changed into the prioritized information processing unit in the state where operations of the information processing units are stopped by the full stop unit 210. However, instead of this, the prioritized information processing unit change unit 180 may determine the information processing unit to be changed into the prioritized information processing unit by periodically referring to the flat lock storage unit 100 without stopping operations of the information processing units.

When the monitor control unit 190 receives the information indicating that the acquisition of the contended resource 50 has failed from the acquisition check unit 170, the monitor control unit 190 executes a subsequent arbitration process regarding the acquisition of the contended resource 50 by using a monitor mode, an example of which will be described below. In the monitor mode, the fat lock storage unit 200 has recorded identification information of all the information processing units which are waiting for the contended resource 50 to be released by another information processing unit in order to acquire the contended resource 50. Specifically, when the monitor control unit 190 receives directions to acquire the contended resource 50, from any one of the prioritized information processing unit 150 and the non-prioritized information processing units 160-1 to 160-N, the monitor control unit 190 registers information for identifying the information processing unit having transmitted the directions, as the identification information of the information processing unit waiting for the release of the contended resource 50, in the fat lock storage unit 200. The exclusion controller 10 does not allocate a computational resource, such as a CPU, to these waiting information processing units. Accordingly, the entire system is in a state where the computational resource is efficiently utilized.

When the monitor control unit 190 receives directions to release the contended resource 50, from an information processing unit, the monitor control unit 190 selects the information processing unit which satisfies a predetermined condition, for example, the information processing unit which has first started waiting, among the information processing units waiting in order to acquire the contended resource 50, thus allowing the selected information processing unit to acquire the contended resource 50.

Incidentally, when the monitor control unit 190 receives the information indicating that the acquisition of the contended resource 50 has failed from the acquisition check unit 170, the monitor control unit 190 may execute a subsequent arbitration process regarding the acquisition of the contended resource 50 by using another arbitrary locking method instead of the above-described process. For example, a locking method which is provided as standard in the operating system managing the exclusion controller 10 may be used.

As described above, when the monitor control unit 190 allows an information processing unit to try to acquire the contended resource 50, the monitor control unit 190 registers a waiting state and the like in the fat lock storage unit 200. Accordingly, a long processing time is required for completing an acquisition check after acquisition is attempted, compared to the acquisition of the contended resource 50 by using the flat lock storage unit 100. However, when there are relatively many information processing units which are waiting in order to acquire the contended resource 50, the monitor control unit 190 does not allocate the computational resource to these waiting information processing units, thereby improving the utilization ratio of the computational resource in the whole system.

In the subsequent description, the acquisition of the contended resource 50 using the flat lock storage unit 100 is referred to as flat lock, and the acquisition of the contended resource 50 using the fat lock storage unit 200 is referred to as fat lock, as names according to the above-described characteristics. Moreover, a state where all the information processing units use the fat lock in order to acquire the contended resource 50 is referred to as a fat state or a weighing mode, and a state where all the information processing units use the flat lock in order to acquire the contended resource 50 is referred to as a flat state or a priority mode.

Incidentally, a locking method used in the fat state is not limited to the aforementioned monitor mode. If the degree of contention is higher than that in the acquisition of the contended resource 50 by using the flat lock storage unit 100 by a predetermined degree, for example, if the frequency of contention is a predetermined value or more, the monitor control unit 190 may allow an information processing unit to acquire the contended resource 50 by using a method of faster operations.

The fat lock storage unit 200 acquires data necessary for the monitor mode used by the monitor control unit 190. The fat lock storage unit 200 typically stores information for identifying the information processing unit having acquired the contended resource 50 and information indicating which of the information processing units are waiting in order to acquire the contended resource 50. For example, the fat lock storage unit 200 may manage the information indicating the information processing units waiting in order to acquire the contended resource 50 in the order of wait initiation time by connecting the information to a first-in first-out (FIFO) queue. In this case, the fat lock storage unit 200 may remove the information indicating an information processing unit from the queue or may newly add the information indicating an information processing unit to the queue in accordance with directions from the monitor control unit 190.

The full stop unit 210 periodically stops operations of the prioritized information processing unit 150 and the non-prioritized information processing units 160-1 to 160-N. For example, when the exclusion controller 10 uses a garbage collection (abbreviated to GC) function to manage a memory, the full stop unit 210 periodically stops operations of the prioritized information processing unit 150 and the non-prioritized information processing units 160-1 to 160-N in order to execute stop-the-world GC. In addition to executing GC, the full stop unit 210 transmits directions to change the prioritized information processing unit to the prioritized information processing unit change unit 180.

As described above, the exclusion controller 10 can allow the prioritized information processing unit 150 to acquire the contended resource 50 at a high speed. Accordingly, if the prioritized information processing unit 150 has a higher frequency of acquiring the contended resource 50 than the other information processing units, an arbitration process regarding the acquisition of the contended resource 50 can be executed at a high speed.

FIGS. 2A to 2E show details of the flat lock storage unit 100 in the first embodiment. The flat lock storage unit 100 includes the prioritized information processing unit information storage area 110 for storing information for identifying the prioritized information processing unit, the prioritized exclusion right storage area 120 for storing prioritized exclusion right information, and the non-prioritized exclusion right storage area 130 for storing non-prioritized exclusion right information. The information for identifying the prioritized information processing unit and the non-prioritized exclusion right information may be, for example, thread IDs of information processing units which are managed by an operating system, or may be thread IDs of information processing units which are managed by a language processor for operating the exclusion controller 10. Moreover, the prioritized exclusion right information is, for example, binary information indicating whether the prioritized information processing unit 150 is trying to acquire the contended resource 50.

FIG. 2A shows an example of the flat lock storage unit 100 at the time when the contended resource 50 is initialized. The prioritized information processing unit information storage area 110 stores "anonymous state" indicating that none of the information processing units is the prioritized information processing unit 150. Moreover, the prioritized exclusion right storage area 120 stores "unlocked" indicating that the prioritized information processing unit 150 is not trying to acquire the contended resource 50. Further, the non-prioritized exclusion right storage area 130 stores "nobody" indicating that none of the information processing units has acquired the non-prioritized exclusion right.

FIG. 2B shows the state where the prioritized information processing unit 150 has been set by the prioritized information processing unit setting unit 140 in FIG. 2A. The prioritized information processing unit information storage area 110 stores ID1, which is information for identifying the prioritized information processing unit 150. FIG. 2C shows the state where the acquisition of the contended resource 50 has been tried by the prioritized information processing unit 150 in FIG. 2B. The prioritized exclusion right storage area 120 stores "locked" indicating that the acquisition of the contended resource 50 has been tried by the prioritized information processing unit 150. FIG. 2D shows the state where the non-prioritized exclusion right has been acquired by the non-prioritized information processing unit 160-1 in FIG. 2B. The non-prioritized exclusion right storage area 130 stores ID2. This ID2 indicates that the non-prioritized exclusion right has been acquired by the information processing unit identified by the identification information of ID2, e.g. the non-prioritized information processing unit 160-1.

FIG. 2E shows the state where the acquisition of the contended resource 50 has been tried by the prioritized information processing unit 150 in FIG. 2D, and also the state where the non-prioritized exclusion right has been acquired by the non-prioritized information processing unit 160-1 in the state shown in FIG. 2C. The prioritized exclusion right storage area 120 stores "locked," and the non-prioritized exclusion right storage area 130 stores "ID2" indicating that the non-prioritized exclusion right has been acquired by the non-prioritized information processing unit 160-1. Two cases leading to the state of FIG. 2E will be described in order.

In the state shown in FIG. 2D, the prioritized information processing unit 150 stores "locked" in the prioritized exclusion right storage area 120 in order to acquire the contended resource 50 in response to directions or the like from a user program. The state at this point is shown in FIG. 2E. Thereafter, the prioritized information processing unit 150 reads non-prioritized exclusion right information stored in the non-prioritized exclusion right storage area 130. The prioritized information processing unit 150 checks that non-prioritized exclusion right information has been already stored therein, i.e. that the non-prioritized information processing unit 160-1 has already acquired the non-prioritized exclusion right. The prioritized information processing unit 150 then removes "locked" from the prioritized exclusion right storage area 120 to store "unlocked" therein, thereby canceling an attempt to acquire the contended resource 50 (return to the state of FIG. 2D).

In the state shown in FIG. 2C, when the non-prioritized information processing unit 160-1 receives directions to acquire the contended resource 50, from a user program or the like, the non-prioritized information processing unit 160-1 stores "ID2" in the non-prioritized exclusion right storage area 130 to the exclusion of the non-prioritized information processing units 160-2 to 160-N. The state at this point is shown in FIG. 2E. Thereafter, the non-prioritized information processing unit 160-1 removes "ID2" stored in the non-prioritized exclusion right storage area 130, thereby releasing the non-prioritized exclusion right (return to the state of FIG. 2C).

As described above, the flat lock storage unit 100 has the prioritized exclusion right storage area 120, in which only the prioritized information processing unit 150 writes, and the non-prioritized exclusion right storage area 130, in which the non-prioritized information processing units 160-1 to 160-N write, individually. Therefore, since the prioritized information processing unit 150 need not write in the prioritized exclusion right storage area 120 to the exclusion of the other information processing units, the prioritized information processing unit 150 can operate at a high speed.

Figure 3:
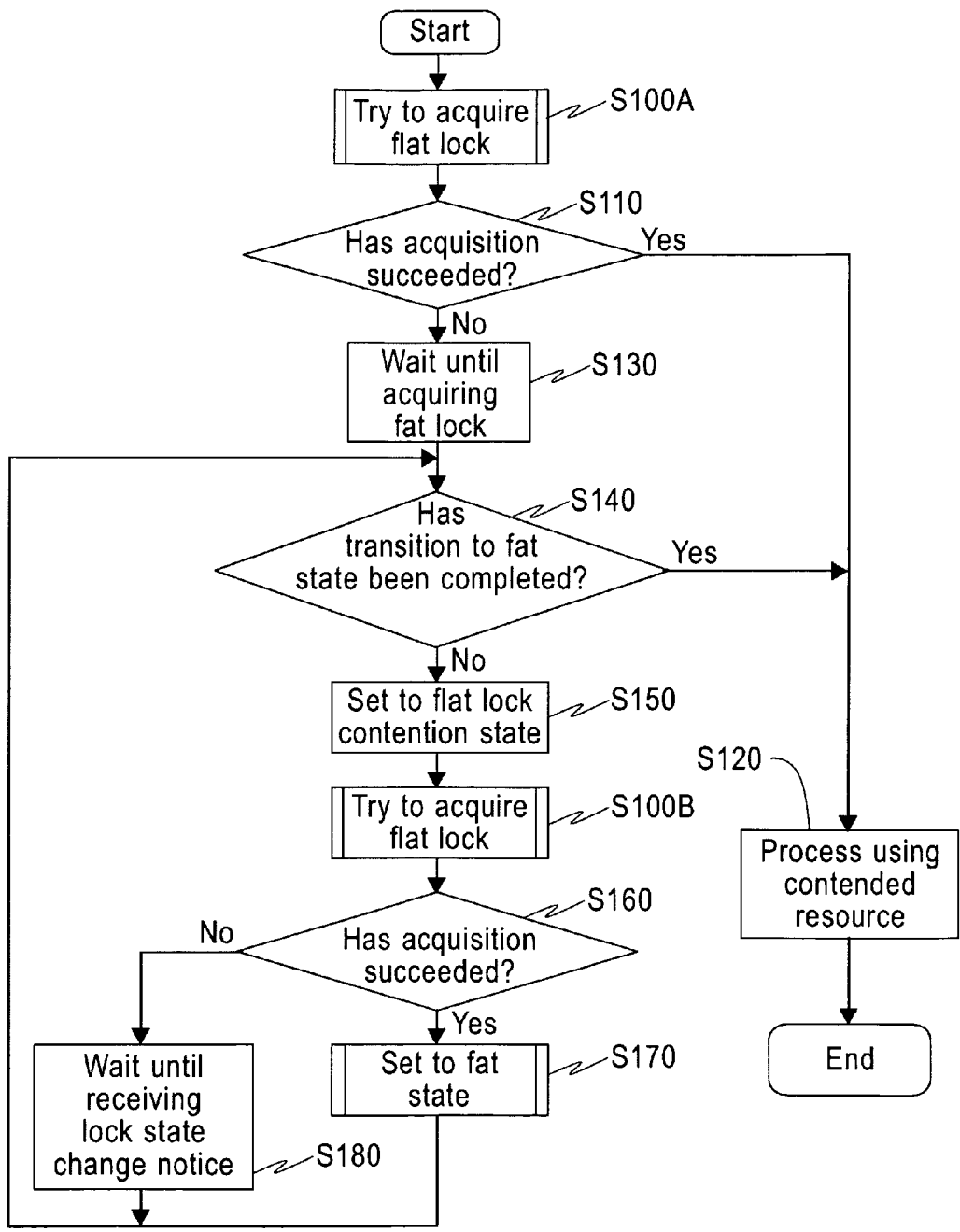
FIG. 3 is an operation flowchart where a prioritized information processing unit 150 or a non-prioritized information processing unit 160 tries to acquire a contended resource in the first embodiment.

FIG. 3 shows an operation flow where the prioritized information processing unit 150 or the non-prioritized information processing unit 160 tries to acquire the contended resource in the first embodiment. The prioritized information processing unit 150 and the non-prioritized information processing units 160-1 to 160-N can concurrently operate in accordance with the operation flows shown in FIGS. 3 to 6. Moreover, in FIG. 3, the prioritized information processing unit 150 and the non-prioritized information processing units 160-1 to 160-N operate in almost the same manner. Therefore, the prioritized information processing unit 150 and the non-prioritized information processing units 160-1 to 160-N are generically named information processing units in the description below.

An information processing unit tries to acquire the flat lock by using the first process and/or the second process in order to acquire the contended resource 50 (S100A). Details thereof will be described later. If the flat lock has been successfully acquired (S110: YES), the information processing unit acquires the contended resource 50 to execute a process using the contended resource 50 (S120).

On the other hand, if the acquisition check unit 170 has failed to acquire the flat lock (S110: NO), the monitor control unit 190 allows the information processing unit to wait until the information processing unit acquires the fat lock (S130). After the information processing unit has acquired the fat lock, the information processing unit checks whether the transition to the fat state has been completed (S140). Details of the check as to whether the transition to the fat state has been completed will be described later in the description of S170. If the information processing unit has checked that the transition to the fat state has been completed (S140: YES), the information processing unit acquires the contended resource 50 by the fat lock to execute a process using the contended resource 50 (S120).

On the other hand, if the information processing unit has checked that the transition to the fat state has not yet been completed (S140: NO), the information processing unit sets the contended resource 50 to be in a flat lock contention state, which indicates that the acquisition of the flat lock has failed and the transition to the fat state has not been completed (S150). For example, the information processing unit writes information indicating the flat lock contention state in a predetermined area on a memory accessible by all the information processing units, thereby setting the contended resource 50 to be in the flat lock contention state.

Subsequently, the information processing unit tries to acquire the flat lock by using the first process and/or the second process (S100B). If the flat lock has been successfully acquired (S160: YES), the information processing unit sets the contended resource 50 to be in the fat state (S170), and returns to S140. Details of S170 will be described later.

On the other hand, if the acquisition of the flat lock has failed (S160: NO), the information processing unit releases the fat lock already acquired in S130 to wait until the information processing unit receives a lock state change notice from another information processing unit (S180). Thereafter, if the information processing unit has received a lock state change notice from another information processing unit, the information processing unit again acquires the fat lock to return to the process of S140.

As described above, the exclusion controller 10 allows the information processing unit having acquired both the flat lock and the fat lock to execute the transition process from the flat state to the fat state. Accordingly, the exclusion controller 10 can avoid disorder or the like in which both the flat lock and the fat lock coexist as locks for acquiring the contended resource 50, in the transition process from the flat lock to the fat lock.

Figure 4:
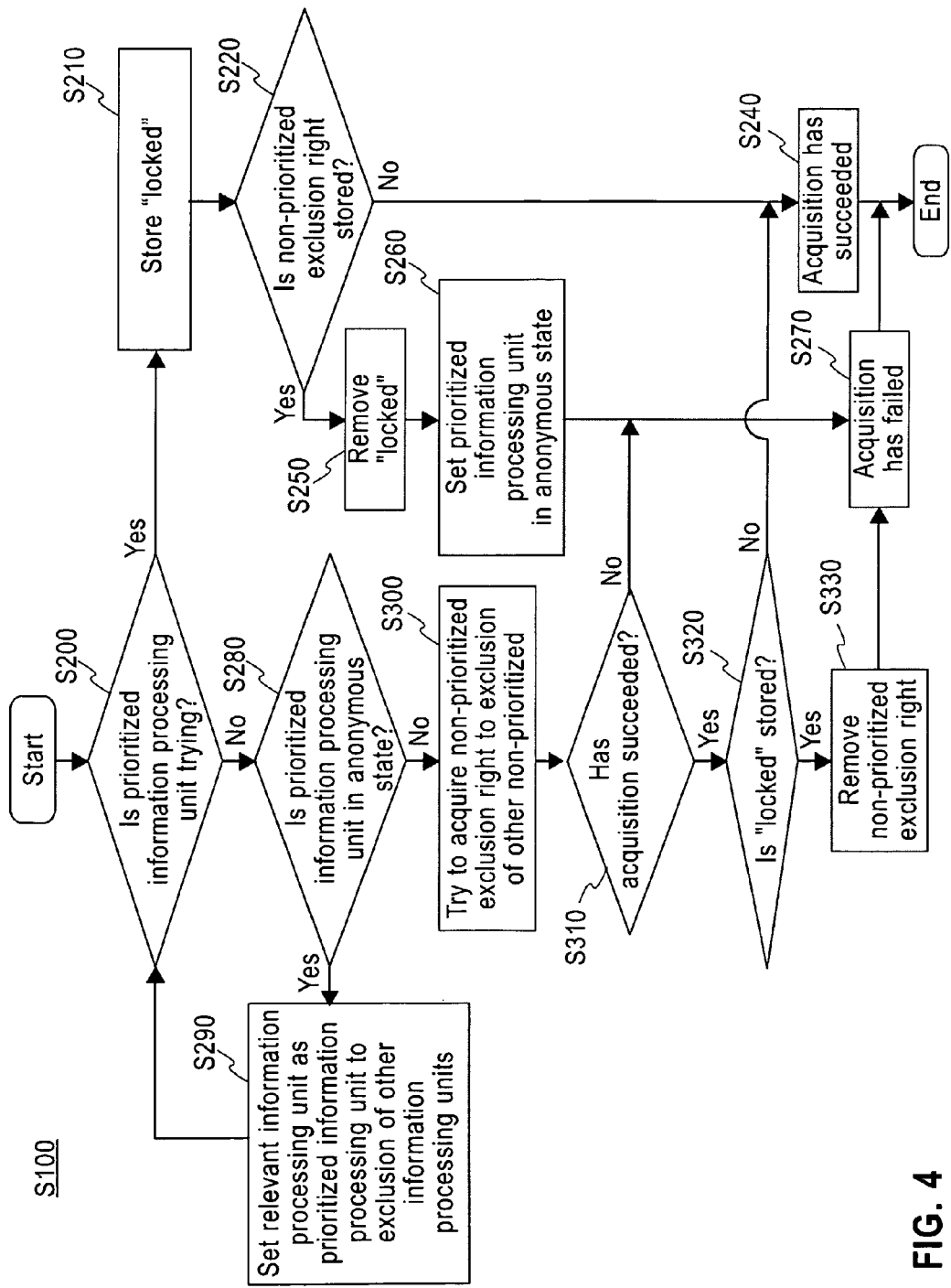
FIG. 4 is an operation flowchart showing details of S100A and S100B in FIG. 3.

FIG. 4 is an operation flow showing details of S100A and S100B in FIG. 3. If the information processing unit executing S100 checks that the information processing unit is the prioritized information processing unit 150 (S200: YES), the information processing unit stores "locked" in the prioritized exclusion right storage area 120 (S210). Then, if non-prioritized exclusion right information is not stored in the non-prioritized exclusion right storage area 130, that is, if "nobody" is stored therein (S220: NO), the prioritized information processing unit 150 acquires the contended resource 50 (S240), and the process comes to an end.

On the other hand, if non-prioritized exclusion right information has been already stored in the non-prioritized exclusion right storage area 130 (S220: YES), that is, if any one of the non-prioritized information processing units 160-1 to 160-N has already acquired the non-prioritized exclusion right, the acquisition check unit 170 removes "locked" stored in the prioritized exclusion right storage area 120 (S250). The prioritized information processing unit change unit 180 then sets prioritized information processing unit information to an anonymous state by storing anonymous state information in the prioritized information processing unit information storage area 110 (S260), and does not allow the prioritized information processing unit 150 to acquire the contended resource 50 (S270), and then the process comes to an end.

On the other hand, if the information processing unit executing S100 has checked that the information processing unit is any one of the non-prioritized information processing units, e.g. the non-prioritized information processing unit 160-1 (S200: NO), the information processing unit checks whether the prioritized information processing unit information stored in the prioritized information processing unit information storage area 110 indicates an anonymous state (S280). If the prioritized information processing unit information indicates an anonymous state (S280: YES), the prioritized information processing unit setting unit 140 executes a process for setting the non-prioritized information processing unit 160-1 as the prioritized information processing unit to the exclusion of the other non-prioritized information processing units, that is, a process for writing, in the prioritized information processing unit information storage area 110, the prioritized information processing unit information indicating that the non-prioritized information processing unit 160-1 is the prioritized information processing unit (S290), and then the process returns to S200. In other words, the prioritized information processing unit setting unit 140 sets as the prioritized information processing unit 150 the information processing unit having first acquired the contended resource 50 after initialization thereof, and sets as the non-prioritized information processing units 160 the other information processing units except the prioritized information processing unit 150.

If the prioritized information processing unit information is not in an anonymous state (S280: NO), the non-prioritized information processing unit 160-1 executes a process for acquiring the non-prioritized exclusion right to the exclusion of the other non-prioritized information processing units (S300).

If the acquisition of the non-prioritized exclusion right has failed (S310: NO), the non-prioritized information processing unit 160-1 cannot acquire the contended resource 50 (S270), and the process comes to an end. On the other hand, if the non-prioritized exclusion right has been successfully acquired (S310: YES), the non-prioritized information processing unit 160-1 checks whether "locked" has been already stored in the prioritized exclusion right storage area 120 (S320). If "locked" is not stored therein (S320: NO), the non-prioritized information processing unit 160-1 acquires the contended resource 50 (S240), and the process comes to an end. On the other hand, if "locked" is stored therein (S320: YES), the non-prioritized information processing unit 160-1 removes the information indicating the non-prioritized exclusion right from the prioritized exclusion right storage area 120 (S330). In this case, the non-prioritized information processing unit 160-1 cannot acquire the contended resource 50 (S270), and the process comes to an end.

As described above, the non-prioritized information processing unit 160-1 executes, as the first process, a process (e.g. S200, S280, S300, S310, S320, and S240) for storing non-prioritized exclusion right information indicating that the non-prioritized information processing unit has acquired the non-prioritized exclusion right, to the exclusion of the other non-prioritized information processing units if non-prioritized exclusion right information has not been stored. On the other hand, the prioritized information processing unit 150 can acquire the contended resource 50 by executing, as the second process requiring a shorter processing time than the first process, a process (e.g. S200, S210, S220, and S240) for storing "locked" in the prioritized exclusion right storage area 120.

Figure 5:
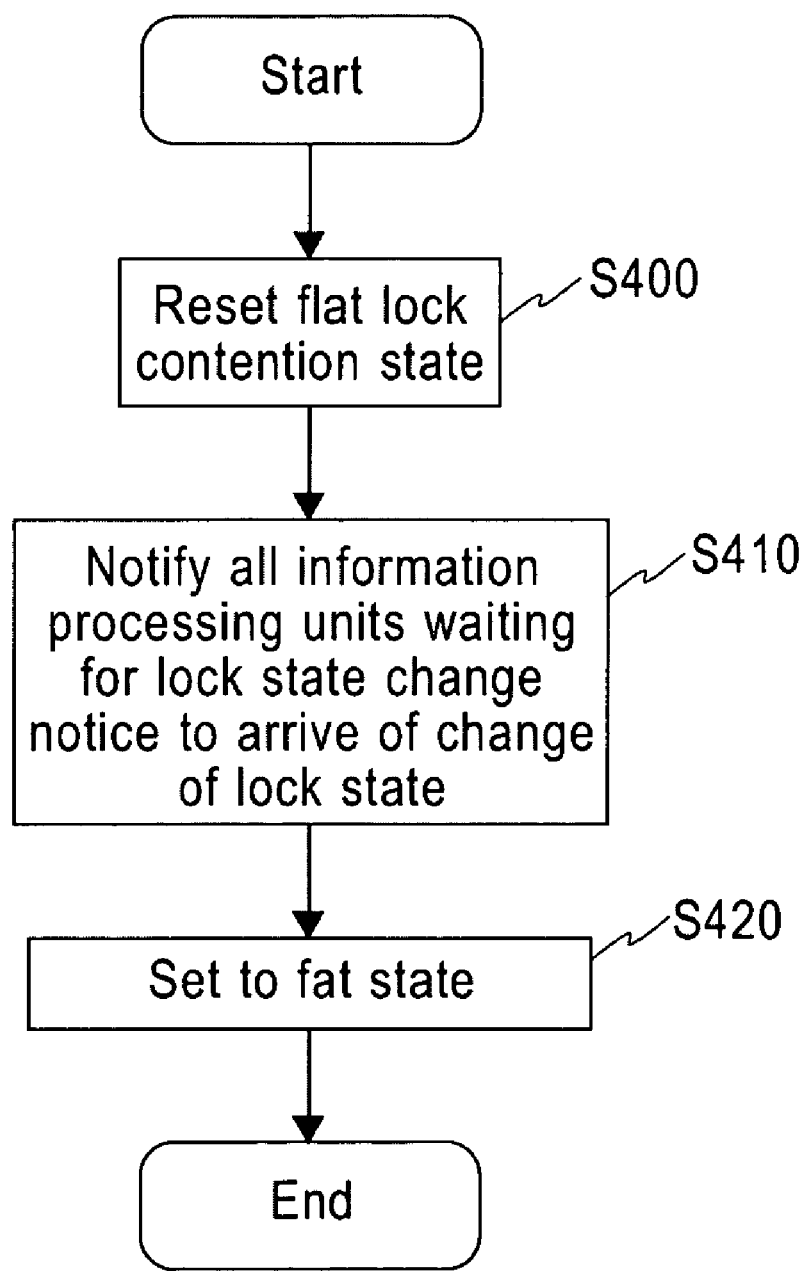
FIG. 5 is an operation flowchart showing details of S170 in FIG. 3.

FIG. 5 shows an operation flow showing details of S170 in FIG. 3. The information processing unit resets the flat lock contention state (S400). Next, the information processing unit notifies all the information processing units waiting for a lock state change notice to arrive (e.g. S180 of FIG. 3) of the change of the lock state (S410). Then, the information processing unit sets the contended resource 50 to the fat state (S420).

The process for setting the contended resource 50 to the fat state is, for example, a process for writing information indicating the fat state in a predetermined area (e.g. the flat lock storage unit 100) on a memory which is accessible by all the information processing units capable of acquiring the contended resource 50 and is provided so as to correspond to the contended resource 50. Therefore, the other information processing units can check whether the contended resource 50 is currently in the fat state, by referring to the predetermined area (e.g. S140 of FIG. 3).

Figure 6:
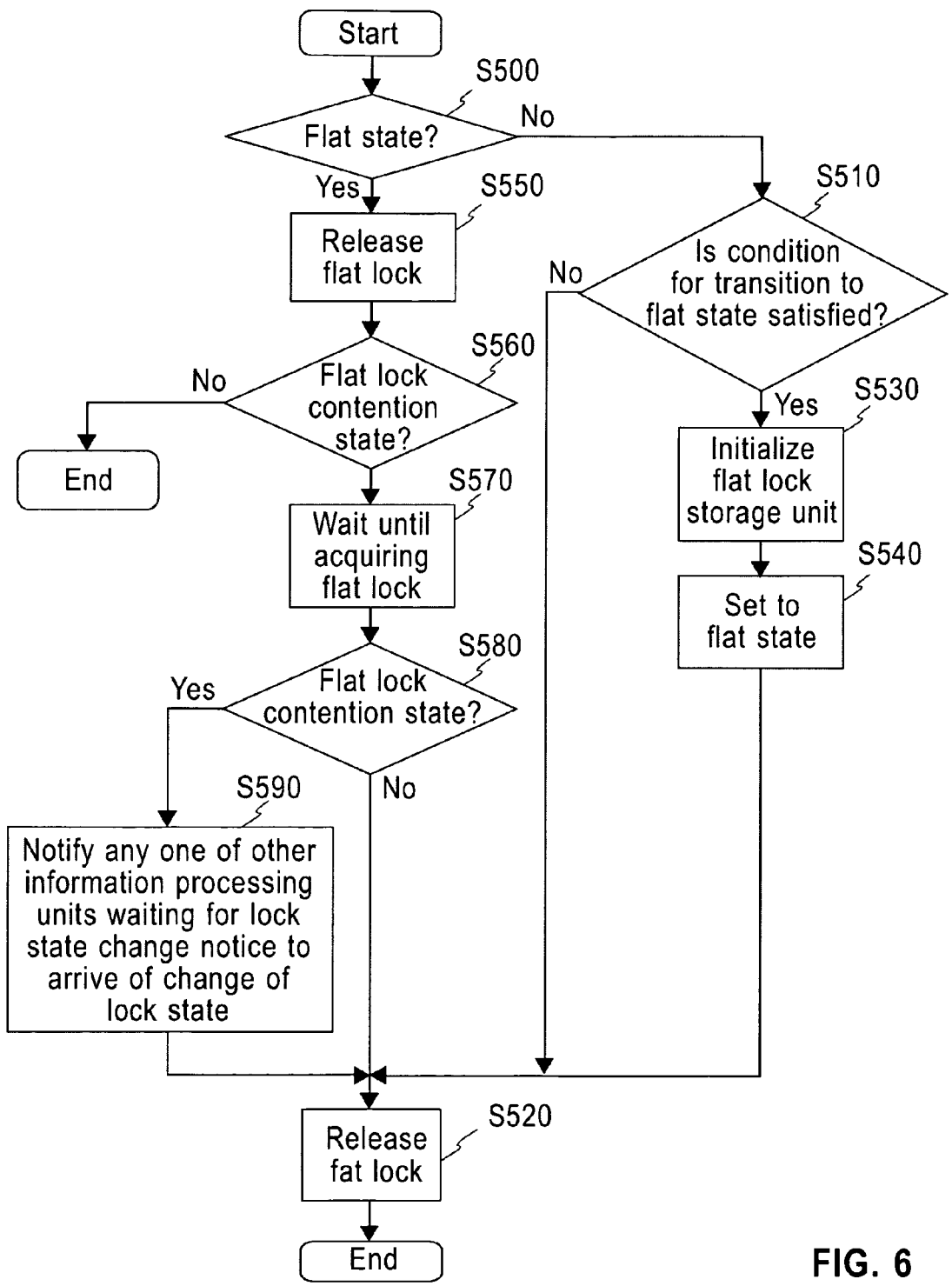
FIG. 6 is an operation flowchart where the prioritized information processing unit 150 or the non-prioritized information processing unit 160 releases the contended resource.

FIG. 6 shows an operation flow where the prioritized information processing unit 150 or the non-prioritized information processing unit 160 releases the contended resource 50. First, the information processing unit checks whether the contended resource 50 is in the flat state, by referring to the flat lock storage unit 100 (S500). If the information processing unit has checked that the contended resource 50 is not in the flat state (S500: NO), the information processing unit checks whether a condition for the transition from the fat state to the flat state is satisfied, e.g., whether there is an information processing unit waiting in order to acquire the contended resource 50 (S510).

If the condition for the transition from the fat state to the flat state is not satisfied (S510: NO), the information processing unit executes a process for releasing the fat lock by using the monitor control unit 190 (S520). On the other hand, if the condition for the transition from the fat state to the flat state is satisfied (S510: YES), the information processing unit initializes the flat lock storage unit 100 (S530), and sets the state for acquiring the contended resource 50 to the flat state (S540).

Incidentally, when the information processing unit initializes the flat lock storage unit 100, the prioritized information processing unit may be set to be in an anonymous state. In this case, the information processing unit can set, as the prioritized information processing unit 150, the information processing unit first acquiring the contended resource 50 after the transition to the flat lock.

On the other hand, if the information processing unit has checked that the contended resource 50 is in the flat state (S500: YES), the information processing unit executes a process for releasing the flat lock, e.g., a process for storing information indicating that the information processing unit has released the contended resource 50, in the prioritized exclusion right storage area 120 or the non-prioritized exclusion right storage area 130 (S550). Subsequently, the information processing unit checks whether the contended resource 50 is set to the flat lock contention state (S560). If the contended resource 50 is not set to be in the flat lock contention state (S560: NO), the releasing process comes to an end. On the other hand, if the contended resource 50 is set to be in the flat lock contention state, the information processing unit tries to acquire the fat lock. Then, if the information processing unit has acquired the fat lock (S570: YES), the information processing unit again checks whether the contended resource 50 is set to be in the flat lock contention state (S580). If the contended resource 50 is set to be in the flat lock contention state (S580: YES), the information processing unit notifies any one of the other information processing units waiting for a lock state change notice to arrive, of the change of the lock state (S590). Subsequently, the information processing unit releases the fat lock (S520).

As described above, if the contended resource 50 is in the flat lock contention state, which is the transition process from the flat lock to the fat lock, the exclusion controller 10 once acquires both the flat lock and the fat lock and then releases both the locks. Therefore, even in a transient state where both the flat lock and the fat lock coexist as locks for acquiring the contended resource 50, the contended resource 50 can be appropriately released.

Modified Example

Figure 7:
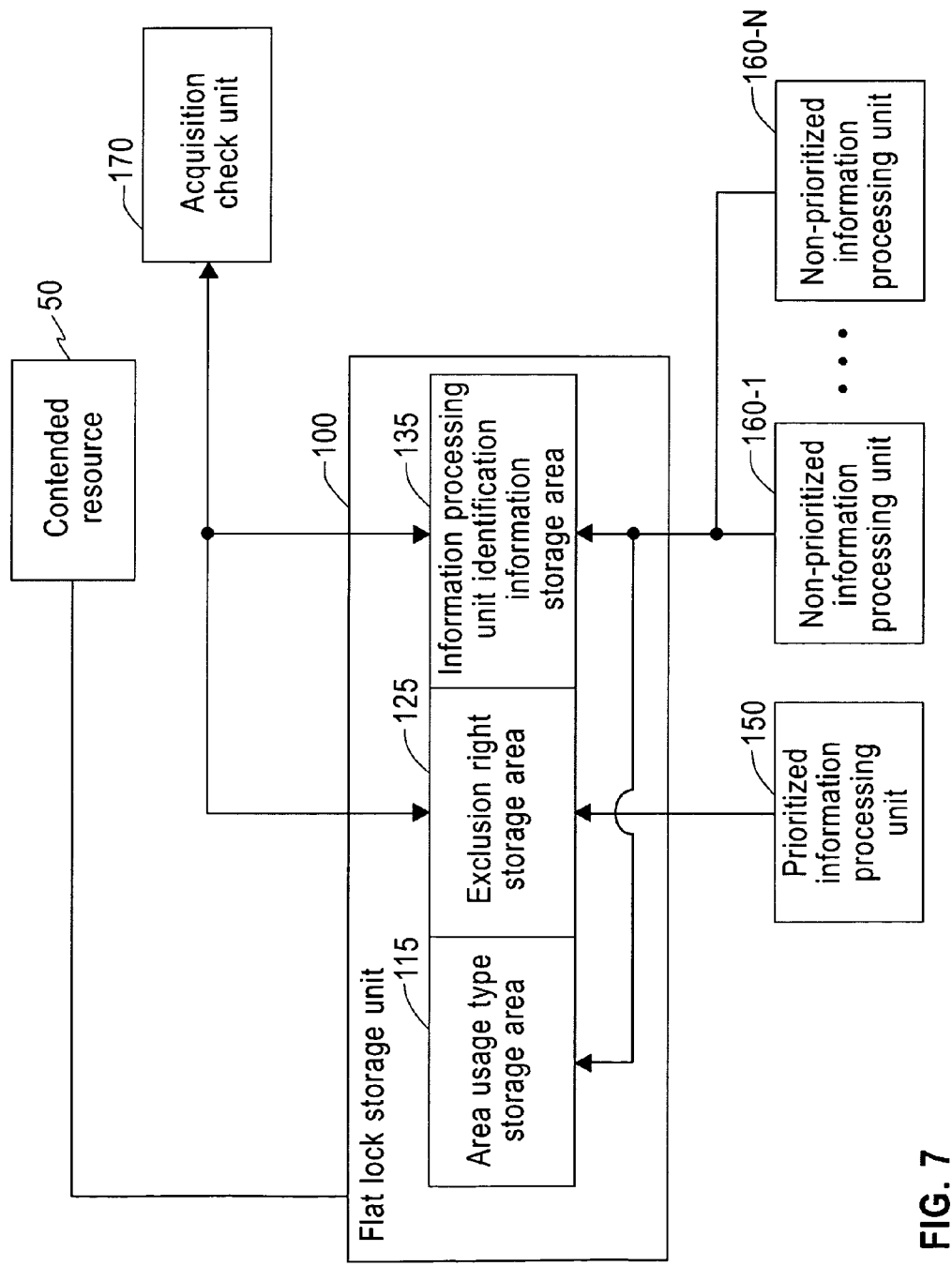
FIG. 7 is a function block diagram of an exclusion controller 10 in a modified example of the first embodiment.

FIG. 7 shows a function block diagram of an exclusion controller 10 in a modified example of the first embodiment. Since the exclusion controller 10 in FIG. 7 has almost the same configuration as that of the exclusion controller 10 shown in FIG. 1, only the differences therebetween will be described. The exclusion controller 10 of the present modified example need not include a prioritized information processing unit setting unit 140, a prioritized information processing unit change unit 180, a monitor control unit 190, a fat lock storage unit 200, and a full stop unit 210, unlike the exclusion controller 10 shown in FIG. 1. Moreover, the flat lock storage unit 100 in FIG. 7 may have an area usage type storage area 115, an exclusion right storage area 125, and an information processing unit identification information storage area 135, instead of the prioritized information processing unit information storage area 110, the prioritized exclusion right storage area 120, and the non-prioritized exclusion right storage area 130 in the flat lock storage unit 100 of FIG. 1, respectively. Here, the exclusion right storage area 125 is an example of a prioritized exclusion right storage area according to the present invention, and the information processing unit identification information storage area 135 is an example of a non-prioritized exclusion right storage area according to the present invention.

The information processing unit identification information storage area 135 stores any one of prioritized information processing unit information and non-prioritized exclusion right information. The area usage type storage area 115 stores area usage type information indicating which of the prioritized information processing unit information and the non-prioritized exclusion right information the information processing unit identification information storage area 135 stores. Note that, since the area usage type information is binary information, the area usage type storage area 115 has a smaller size than that of the prioritized information processing unit information storage area 110 in FIG. 1.

The prioritized information processing unit 150 acquires the contended resource 50 by storing "locked" in the exclusion right storage area 125, and releases the contended resource 50 by removing "locked" from the exclusion right storage area 125. If the information processing unit identification information storage area 135 does not store the identification information of the prioritized information processing unit 150 in the case where the prioritized information processing unit 150 has stored "locked" in the exclusion right storage area 125, the acquisition check unit 170 writes "unlocked" in the exclusion right storage area 125, thereby canceling the acquisition of the contended resource 50 by the prioritized information processing unit 150.

The non-prioritized information processing unit 160 acquires an access right to the flat lock storage unit 100 to the exclusion of the other information processing units, and executes the following process. If "locked" is not stored in the exclusion right storage area 125, the non-prioritized information processing unit 160 stores the identification information of the non-prioritized information processing unit 160 in the information processing unit identification information storage area 135, and stores "locked" in the exclusion right storage area 125. Further, the non-prioritized information processing unit 160 stores the area usage type information indicating that non-prioritized exclusion right information is stored, in the area usage type storage area 115.

As described above, if only the prioritized information processing unit 150 acquires the contended resource 50, the prioritized information processing unit 150 acquires the contended resource 50 at a high speed by writing in the exclusion right storage area 125. On the other hand, once the non-prioritized information processing unit 160 succeeds in acquiring the contended resource 50, the non-prioritized information processing unit 160 allows the information processing unit identification information storage area 135 to store non-prioritized exclusion right information, thereby acquiring the contended resource 50 to the exclusion of the other non-prioritized information processing units. In this case, the prioritized information processing unit 150 loses an originally possessed priority right to acquire the contended resource 50, and acquires the contended resource 50 by acquiring the non-prioritized exclusion right similarly to the non-prioritized information processing unit 160.

FIGS. 8A to 8D show details of the flat lock storage unit 100 in the modified example of the first embodiment. The flat lock storage unit 100 includes the area usage type storage area 115 for storing an area usage type, the exclusion right storage area 125 for storing prioritized exclusion right information, and the information processing unit identification information storage area 135 for storing non-prioritized exclusion right information. The area usage type information is binary information indicating which of the prioritized information processing unit information and the non-prioritized exclusion right information the information processing unit identification information storage area 135 stores. In other words, the size of the area usage type storage area 115 is, for example, one bit.

FIG. 8A shows an example of the flat lock storage unit 100 at the time when the contended resource 50 is initialized. The area usage type storage area 115 stores "prioritized information processing unit" indicating that the information processing unit identification information storage area 135 stores prioritized information processing unit information. The exclusion right storage area 125 stores "unlocked" indicating that the prioritized information processing unit 150 is not trying to acquire the contended resource 50. The information processing unit identification information storage area 135 stores "ID1" as information for identifying the prioritized information processing unit 150.

FIG. 8B shows the state where the prioritized information processing unit 150 has tried to acquire the contended resource 50 in FIG. 8A. The exclusion right storage area 125 stores "locked" indicating that the prioritized information processing unit 150 has tried to acquired the contended resource 50.

FIG. 8C shows the state where the non-prioritized information processing unit 160-1 has acquired the non-prioritized exclusion right in FIG. 8A. The area usage type storage area 115 stores "non-prioritized exclusion right" indicating that the information processing unit identification information storage area 135 stores non-prioritized exclusion right information. The information processing unit identification information storage area 135 stores ID2 as information for identifying the non-prioritized information processing unit 160-1, in order to indicate that the non-prioritized exclusion right has been acquired by the non-prioritized information processing unit 160-1.

Here, in order to change the state of FIG. 8A into the state of FIG. 8C, the non-prioritized information processing unit 160-1 executes the following process to the exclusion of the other information processing units. First, the non-prioritized information processing unit 160-1 checks whether "nobody" indicating that none of the information processing units has acquired the contended resource 50 is stored in the information processing unit identification information storage area 135, and at the same time, whether "unlocked" is stored in the exclusion right storage area 125. Then, if both results are YES, ID2 is stored in the information processing unit identification information storage area 135, and "locked" is stored in the exclusion right storage area 125. It is desirable that this series of processes are executed by using a compare-and-swap instruction or the like to the exclusion of the other information processing units. Even if a compare-and-swap instruction is applicable only to one word on memory, the non-prioritized information processing unit 160-1 can appropriately execute a process for acquiring the non-prioritized exclusion right by setting the exclusion right storage area 125 and the information processing unit identification information storage area 135 as continuous areas as shown in the present embodiment.

FIG. 8D shows the state where the non-prioritized exclusion right has been released by the non-prioritized information processing unit 160-1 in FIG. 8C. The information processing unit identification information storage area 135 stores "nobody."

As described above, the flat lock storage unit 100 in the present example has a small size compared to the flat lock storage unit 100 in FIG. 1. Accordingly, the exclusion controller 10 of the present modified example can appropriately arbitrate the acquisition of the contended resource 50 by using a smaller storage area than that of the exclusion controller 10 in FIG. 1, while allowing the prioritized information processing unit 150 to operate at a higher speed than the non-prioritized information processing unit 160 similarly to FIG. 1.

Figure 9:
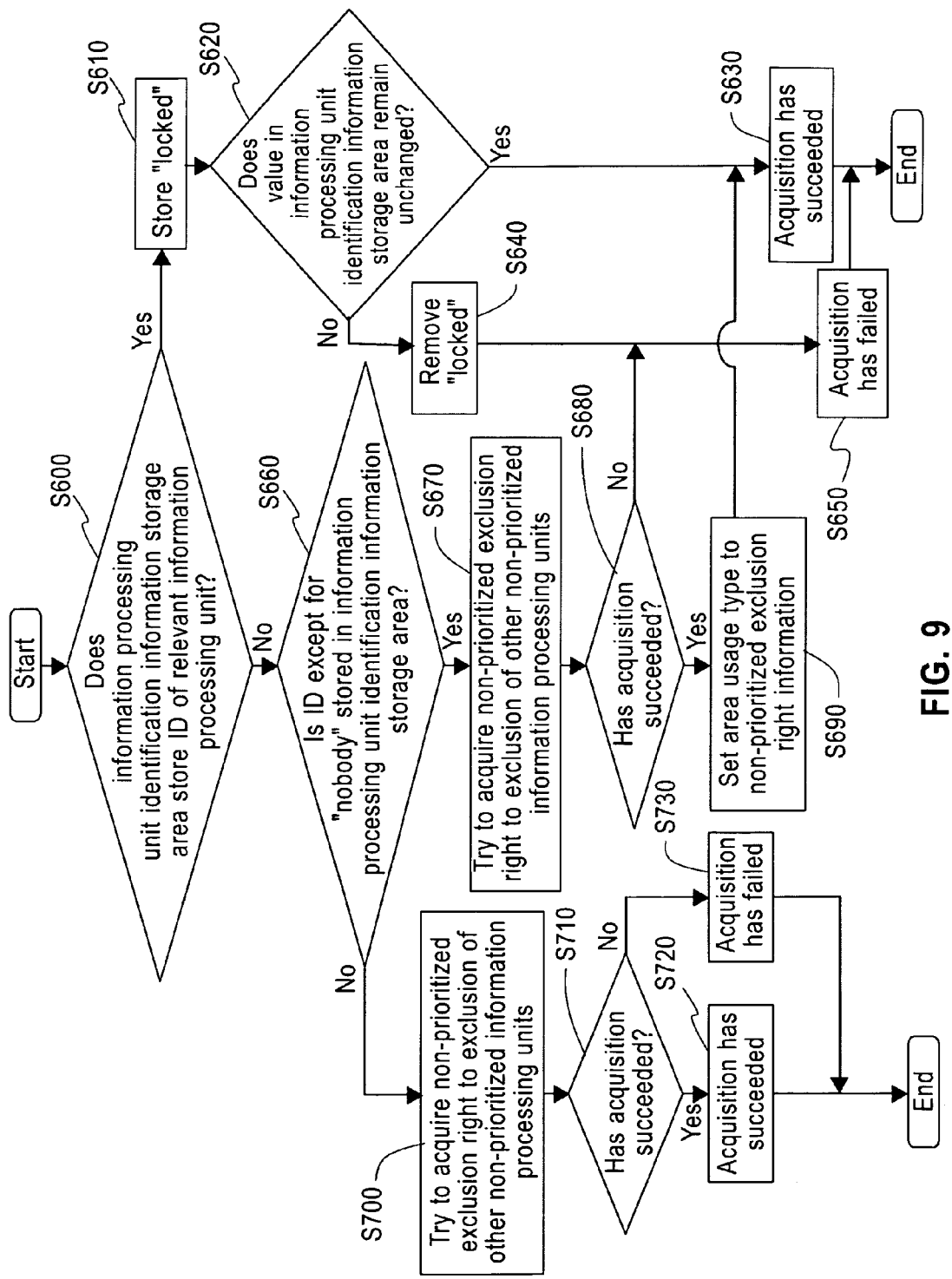
FIG. 9 is an operation flowchart where a prioritized information processing unit 150 or a non-prioritized information processing unit 160 tried to acquire a contended resource in the modified example of the first embodiment.

FIG. 9 is an operation flow where the prioritized information processing unit 150 or the non-prioritized information processing unit 160 tries to acquire the contended resource in the modified example of the first embodiment. In some parts of this flow, both the prioritized information processing unit 150 and the non-prioritized information processing unit 160 operate in almost the same manner. Accordingly, in such parts, the prioritized information processing unit 150 and the non-prioritized information processing unit 160 are generically referred to as information processing units.

When an information processing unit tries to acquire the contended resource 50, the information processing unit checks whether the information processing unit identification information storage area 135 stores the ID for identifying the information processing unit (S600). If the information processing unit identification information storage area 135 stores the ID for identifying the information processing unit (S600: YES), the prioritized information processing unit 150 stores "locked" in the exclusion right storage area 125. The prioritized information processing unit 150 then reads the information processing unit identification information storage area 135 again. If the prioritized information processing unit 150 has checked that the information in the information processing unit identification information storage area 135 has not changed from the information at the time of S600 (S620: YES), the contended resource 50 is successfully acquired (S630), and the process comes to an end. On the other hand, if the prioritized information processing unit 150 has checked that the information in the information processing unit identification information storage area 135 has changed from the information at the time of S600 (S620: NO), the prioritized information processing unit 150 removes "locked" from the exclusion right storage area 125 to store "unlocked" therein. In this case, the prioritized information processing unit 150 fails to acquire the contended resource 50 (S650), and the process comes to an end.

If the information processing unit identification information storage area 135 does not store the ID for identifying the information processing unit (S600: NO), the non-prioritized information processing unit 160 checks whether an ID other than "nobody" is stored in the information processing unit identification information storage area 135 (S660). If an ID other than "nobody" is stored in the information processing unit identification information storage area 135 (S660: YES), the non-prioritized information processing unit 160 tries to acquire the non-prioritized exclusion right to the exclusion of the other non-prioritized information processing units (S670). If the acquisition has failed (S680: NO), the information processing unit fails to acquire the contended resource 50 (S650), and the process comes to an end. On the other hand, if the non-prioritized exclusion right has been successfully acquired (S680: YES), the information processing unit stores, in the area usage type storage area 115, information indicating that the information processing unit identification information storage area 135 stores non-prioritized exclusion right information (S690). In this case, the information processing unit succeeds in acquiring the contended resource 50 (S630), and the process comes to an end.

If "nobody" is stored in the information processing unit identification information storage area 135 (S660: NO), the non-prioritized information processing unit 160 tries to acquire the non-prioritized exclusion right to the exclusion of the other non-prioritized information processing units (S700). If the acquisition has failed (S710: NO), the non-prioritized information processing unit 160 fails to acquire the contended resource 50 (S730), and the process comes to an end. On the other hand, if the non-prioritized exclusion right has been successfully acquired (S710: YES), the non-prioritized information processing unit 160 succeeds in acquiring the contended resource 50 (S720), and the process comes to an end. The information processing unit may operate by using a spin lock in which the above-described operations are repeated until the contended resource 50 is successfully acquired, or may execute a process for transitioning to another locking method if the acquisition of the contended resource 50 has failed.

As described above, when only the prioritized information processing unit 150 has acquired the contended resource 50, the exclusion controller 10 allows the prioritized information processing unit 150 to acquire the contended resource 50 by writing on the flat lock storage unit 100, thus enabling fast operations. On the other hand, even when the non-prioritized information processing unit 160 has acquired the contended resource 50, the exclusion controller 10 can appropriately arbitrate the acquisition of the contended resource 50.

Second Embodiment

Figure 10:
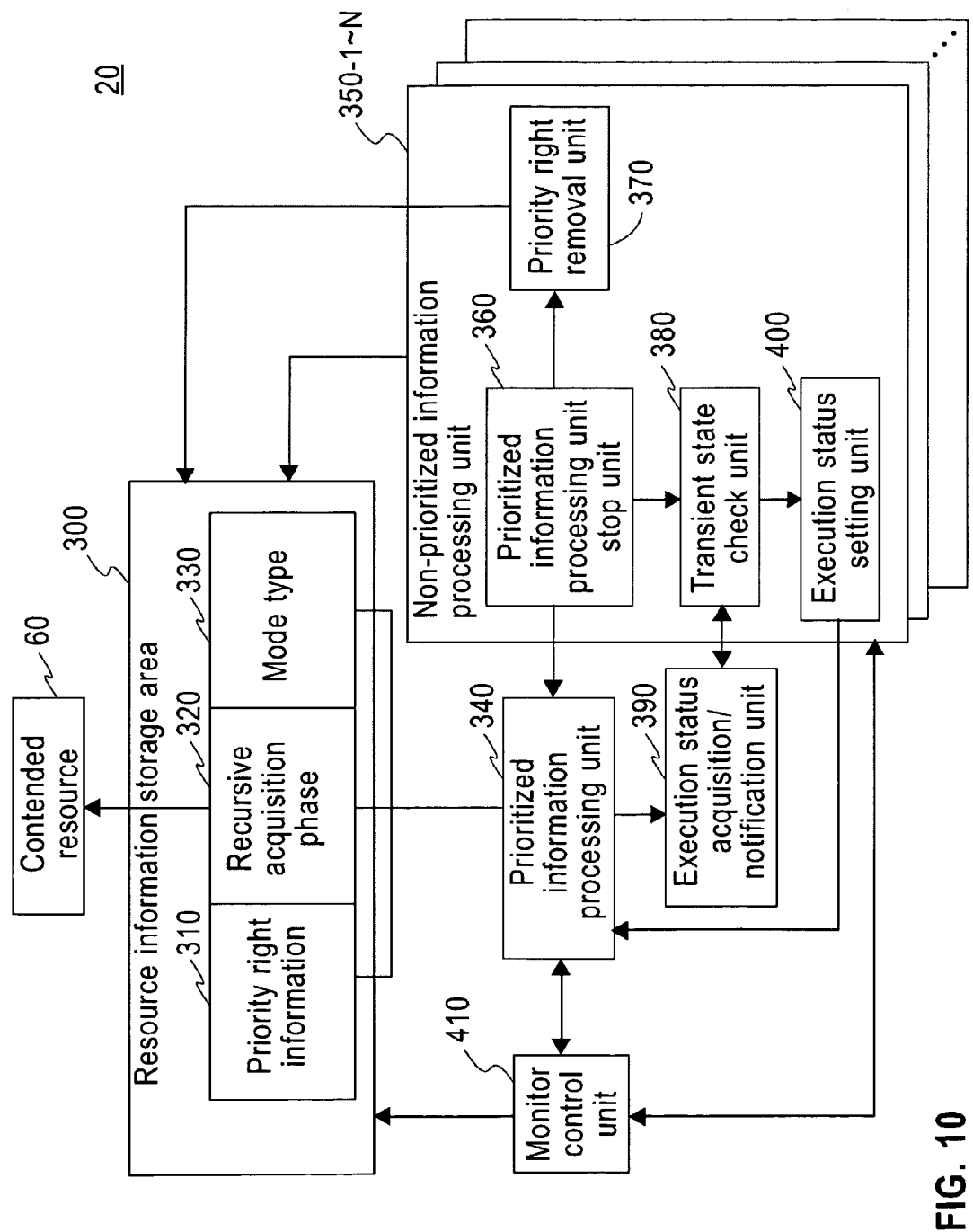
FIG. 10 is a function block diagram of an exclusion controller 20 in a second embodiment.

FIG. 10 is a function block diagram of an exclusion controller 20 in a second embodiment. The exclusion controller 20 includes a contended resource 60, a resource information storage area 300, a prioritized information processing unit 340 as an example of a first thread, non-prioritized information processing units 350-1 to 350-N as examples of a second thread, an execution state acquisition/notification unit 390, and a monitor control unit 410. The exclusion controller 20 has an object to arbitrate the acquisition of the contended resource 60 among the prioritized information processing unit 340 and the non-prioritized information processing units 350-1 to 350-N.

The contended resource 60 is a resource to be exclusively acquired by any one of the prioritized information processing unit 340 and the non-prioritized information processing units 350-1 to 350-N, which asynchronously operate. Other details of the contended resource 60 are almost the same as those of the contended resource 50 described in FIG. 1. Therefore, a description thereof will be omitted.

The resource information storage area 300 has a priority right information field 310, a recursive acquisition phase field 320, and a mode type field 330. The priority right information field 310 stores priority right information indicating that the prioritized information processing unit exists. For example, the priority right information is information (thread ID or the like) for identifying the prioritized information processing unit. If no information processing unit is set as the prioritized information processing unit, the priority right information field 310 stores anonymous state information indicating that no information processing unit is set as the prioritized information processing unit. The recursive acquisition phase field 320 stores resource information indicating whether the contended resource 60 has been acquired by any one of the plurality of information processing units. The mode type field 330 stores mode type information identifying either a priority mode or a normal mode. In the priority mode, the resource information storage area 300 is used for acquiring the contended resource 60. In the normal mode, the monitor control unit 410 is used for acquiring the contended resource 60.

If the mode type information stored in the mode type field 330 indicates the priority mode, the prioritized information processing unit 340 executes the following process. First, the prioritized information processing unit 340 executes, as an example of the second process according to the present invention, a process for reading the contents of the priority right information field 310 and writing resource information in the recursive acquisition phase field 320 if priority right information is stored in the priority right information field 310, thereby acquiring the contended resource 60. On the other hand, if anonymous state information is stored in the priority right information field 310, the prioritized information processing unit 340 exclusively writes information for identifying the prioritized information processing unit 340 in the priority right information field 310.

On the other hand, if the mode type information stored in the mode type field 330 indicates the normal mode, the prioritized information processing unit 340 acquires the contended resource 60 by notifying the monitor control unit 410 that the prioritized information processing unit 340 tries to acquire the contended resource 60, instead of the above-described process.

Moreover, if the mode type information stored in the mode type field 330 indicates the priority mode, the prioritized information processing unit 340 releases the contended resource 60 by removing resource information from the recursive acquisition phase field 320. On the other hand, if the mode type information stored in the mode type field 330 indicates the normal mode, the prioritized information processing unit 340 releases the contended resource 60 by transmitting directions to release the contended resource 60 to the monitor control unit 410.

The non-prioritized information processing unit 350-1 has a prioritized information processing unit stop unit 360, a priority right removal unit 370, a transient state check unit 380, and an execution state setting unit 400. When the non-prioritized information processing unit 350-1 acquires the contended resource 60, the prioritized information processing unit stop unit 360 first stops the prioritized information processing unit 340. Next, the prioritized information processing unit stop unit 360 notifies the priority right removal unit 370 and the transient state check unit 380 that the prioritized information processing unit stop unit 360 has stopped the prioritized information processing unit 340.

For example, when the information processing units are threads, the prioritized information processing unit stop unit 360 may stop the prioritized information processing unit 340 by calling the SuspendThread function. Instead of this, with an interrupt handler previously provided in the prioritized information processing unit 340, the prioritized information processing unit stop unit 360 suspends the process of the prioritized information processing unit 340 by interrupting the prioritized information processing unit 340. In this case, the processes handled by the priority right removal unit 370, the transient state check unit 380, and the execution state setting unit 400 may be executed in the interrupt handler of the prioritized information processing unit 340.

When the priority right removal unit 370 is notified from the prioritized information processing unit stop unit 360 that the prioritized information processing unit stop unit 360 has stopped the prioritized information processing unit 340, the priority right removal unit 370 acquires an exclusive access right, which is an example of a non-prioritized exclusion right, to the resource information storage area 300. The priority right removal unit 370 then removes priority right information from the priority right information field 310, stores information used by the monitor control unit 410 in the priority right information field 310 and the recursive acquisition phase field 320, and stores mode type information indicating the normal mode in the mode type field 330.

When the transient state check unit 380 is notified from the prioritized information processing unit stop unit 360 that the prioritized information processing unit stop unit 360 has stopped the prioritized information processing unit 340, the transient state check unit 380 transmits directions to acquire the execution state of the prioritized information processing unit 340 to the execution state acquisition/notification unit 390. If the transient state check unit 380 has checked, based on the execution state received from the execution state acquisition/notification unit 390, that the stopped prioritized information processing unit 340 is executing the second process, i.e. that the stopped prioritized information processing unit 340 is executing a process for acquiring or releasing the contended resource 60 without using an indivisible instruction, such as a compare-and-swap instruction, then the transient state check unit 380 transmits the check result to the execution state setting unit 400.

When the execution state acquisition/notification unit 390 receives directions to acquire the execution state of the prioritized information processing unit 340, from the transient state check unit 380, the execution state acquisition/notification unit 390 acquires, from the prioritized information processing unit 340, the execution state thereof, e.g. execution location information indicating the execution location of a program in the prioritized information processing unit 340. The execution state acquisition/notification unit 390 then transmits the execution state of the prioritized information processing unit 340 to the transient state check unit 380, thereby notifying the non-prioritized information processing unit 350 of the execution state of the prioritized information processing unit 340. The execution location information is, for example, a program counter in the prioritized information processing unit 340. Instead of this, the execution state acquisition/notification unit 390 may acquire information for identifying a function currently being executed by the prioritized information processing unit 340, or may acquire the value of a predetermined register in the prioritized information processing unit 340.

When the execution state setting unit 400 has received from the transient state check unit 380 the check result indicating that the prioritized information processing unit 340 is executing the second process, the execution state setting unit 400 sets the execution state of the prioritized information processing unit 340 to the state where the prioritized information processing unit 340 is not acquiring the contended resource 60 by using the second process. For example, the execution state setting unit 400 sets the execution state of the prioritized information processing unit 340 to the state before the prioritized information processing unit 340 reads the contents of the priority right information field 310. The execution state setting unit 400 then allows the prioritized information processing unit 340 to resume operations.

If the processes handled by the priority right removal unit 370 and the execution state setting unit 400 are completed, the non-prioritized information processing unit 350-1 tries to acquire the contended resource 60 by notifying the monitor control unit 410 that the non-prioritized information processing unit 350-1 tries to acquire the contended resource 60. On the other hand, the non-prioritized information processing unit 350-1 releases the contended resource 60 by notifying the monitor control unit 410 of directions to release the contended resource 60. Note that operations of the non-prioritized information processing units 350-2 to 350-N are almost the same as those of the non-prioritized information processing unit 350-1 and therefore a description thereof will be omitted.

When the monitor control unit 410 receives, from each of the prioritized information processing unit 340 and the non-prioritized information processing units 350-1 to 350-N, a notice indicating that the information processing unit tries to acquire the contended resource 60, the monitor control unit 410 allows any one of the prioritized information processing unit 340 and the non-prioritized information processing units 350-1 to 350-N to acquire the contended resource 60. In this case, the monitor control unit 410 uses the priority right information field 310 and the recursive acquisition phase field 320 as needed. When the monitor control unit 410 receives directions to release the contended resource 60, from each of the prioritized information processing unit 340 and the non-prioritized information processing units 350-1 to 350-N, the monitor control unit 410 releases the contended resource 60, and allows another information processing unit waiting in order to acquire the contended resource 60, to acquire the contended resource 60. An example of a process in which the monitor control unit 410 arbitrates the acquisition of the contended resource 60 is almost the same as that of the monitor control unit 190 in FIG. 1. Therefore, a description thereof will be omitted.

As described above, when only the prioritized information processing unit 340 tries to acquire the contended resource 60, the exclusion controller 20 can allow the prioritized information processing unit 340 to acquire the contended resource 60 by reading the resource information storage area 300 and writing in the resource information storage area 300 without using an indivisible instruction, such as a compare-and-swap instruction, which requires a long processing time. Therefore, the exclusion controller 20 can allow the prioritized information processing unit 340 to acquire and release the contended resource 60 at a high speed.

Moreover, when the non-prioritized information processing unit 350 tries to acquire the contended resource 60, the exclusion controller 20 can arbitrate the acquisition of the contended resource 60 in order to ensure exclusive access to the contended resource 60.

Figure 11:
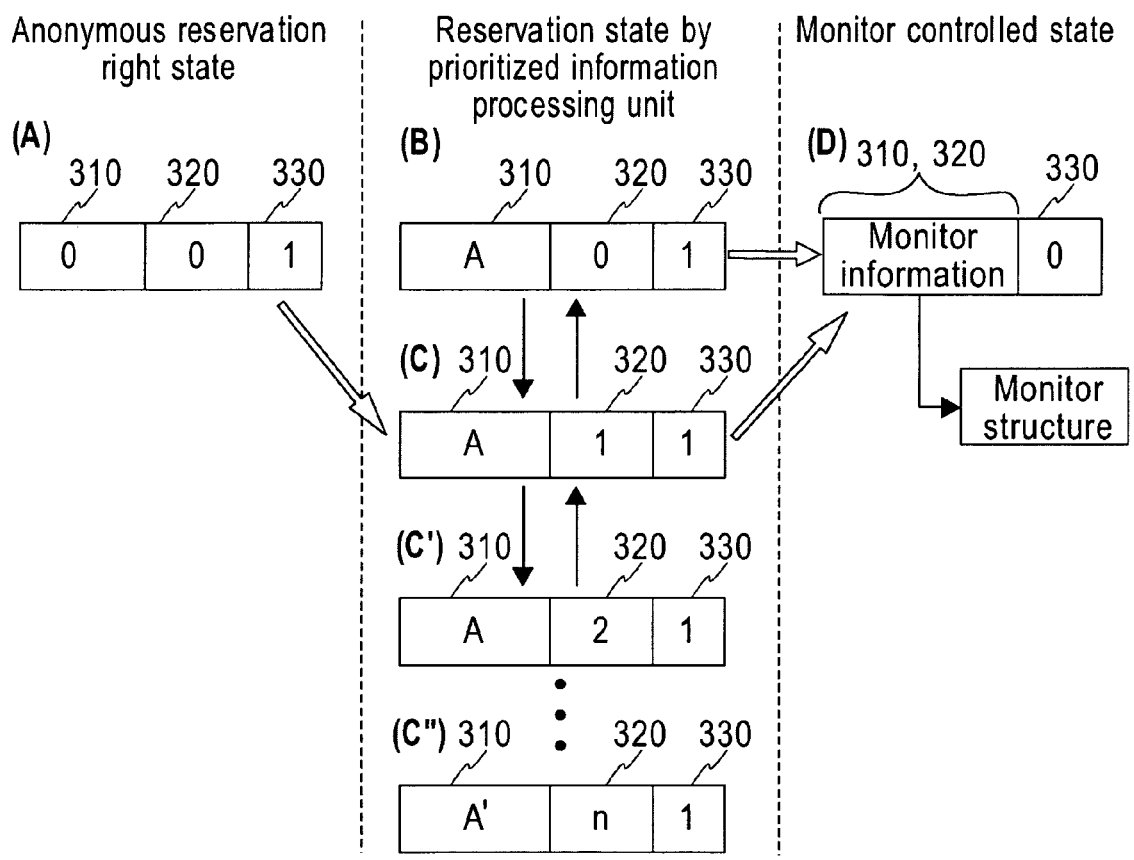
FIG. 11 is a view showing details of a resource information storage area 300 in the second embodiment.

FIGS. 11A to 11D shows details of the resource information storage area 300 in the second embodiment. FIG. 11A shows the initial state of the resource information storage area 300 when the contended resource 60 has been initialized, for example. The priority right information field 310 stores "0" indicating that priority right information is not set, i.e. indicating anonymous state information. The recursive acquisition phase field 320 stores "0" indicating that the contended resource 60 is not acquired. The mode type field 330 stores "1" indicating the priority mode.

FIG. 11C shows the state where the prioritized information processing unit 340 has acquired the contended resource 60 in FIG. 11A. The prioritized information processing unit 340 writes "A," which is information for identifying the prioritized information processing unit 340, in the priority right information field 310. The prioritized information processing unit 340 writes "1" indicating that the prioritized information processing unit 340 has acquired the contended resource 60, in the recursive acquisition phase field 320. Note that the prioritized information processing unit 340 may further recursively acquire the contended resource 60 having already been acquired, as shown in FIGS. 11C' to 11C".

FIG. 11B shows the state where the prioritized information processing unit 340 has released the contended resource 60 in FIG. 11C. The prioritized information processing unit 340 releases the contended resource 60 by writing "0" indicating that the contended resource 60 is not acquired, in the recursive acquisition phase field 320. Note that, if it is previously predicted that the contended resource 60 is frequently acquired by a specific information processing unit, the state shown in FIG. 11B may be set as the initial state of the resource information storage area 300. Moreover, if it is previously predicted that contention tends to occur in the acquisition of the contended resource 60, the state shown in FIG. 11D may be set as the initial state of the resource information storage area 300.

As described above, in a reservation state, which is a state where only the prioritized information processing unit 340 tries to acquire the contended resource 60, the prioritized information processing unit 340 can execute a process for acquiring and releasing the contended resource 60 by rewriting the value in the recursive acquisition phase field 320. In this case, it is ensured that the prioritized information processing unit 340 can access the resource information storage area 300 to the exclusion of the other information processing units. Accordingly, the prioritized information processing unit 340 can acquire the contended resource 60, without using a compare-and-swap instruction or the like requiring a long processing time, by read and write instructions requiring shorter processing times than the compare-and-swap instruction and the like.

FIG. 11D shows the state where the non-prioritized information processing unit 350-1 has tried to acquire the contended resource 60 in FIG. 11B or 11C. When the non-prioritized information processing unit 350-1 tries to acquire the contended resource 60, the non-prioritized information processing unit 350-1 acquires an exclusive access right to the resource information storage area 300. This is to avoid duplicate processes for transitioning to the normal mode by the non-prioritized information processing unit 350-1 and the other non-prioritized information processing units which may try to acquire the contended resource 60.

The priority right removal unit 370 stores mode type information indicating the normal mode, i.e. "0" in the mode type field 330, and also stores monitor information used by the monitor control unit 410 in the normal mode, in the priority right information field 310 and the recursive acquisition phase field 320. Instead of this, if the size of the information used in the normal mode is larger than the total size of the priority right information field 310 and the recursive acquisition phase field 320, the priority right removal unit 370 may generate a monitor structure for storing the monitor information used in the normal mode, in a predetermined area in a memory, thus storing information indicating the location of the monitor structure in the priority right information field 310 and the recursive acquisition phase field 320.

Figure 12:
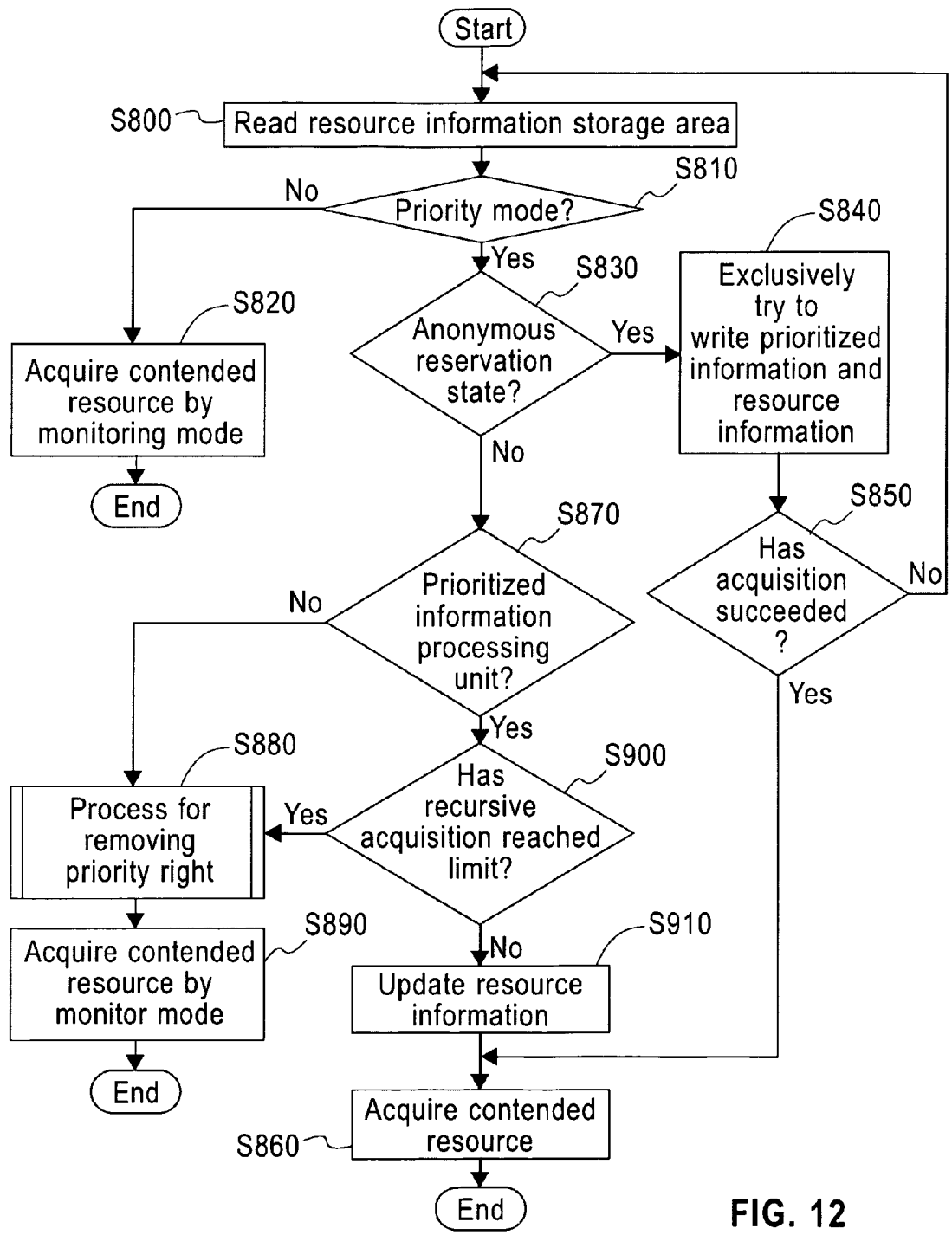
FIG. 12 is an operation flowchart where a prioritized information processing unit 340 or a non-prioritized information processing unit 350 tries to acquire a contended resource in the second embodiment.

FIG. 12 is an operation flow where the prioritized information processing unit 340 or the non-prioritized information processing unit 350 tries to acquire the contended resource in the second embodiment. In some parts of this drawing, both the prioritized information processing unit 340 and the non-prioritized information processing unit 350 operate in almost the same manner. Therefore, in such parts, the prioritized information processing unit 340 and the non-prioritized information processing unit 350 are generically referred to as information processing units. When an information processing unit receives directions to acquire the contended resource 60, the information processing unit first reads the resource information storage area 300 (S800). If the information processing unit has checked, based on the read information, that the acquisition mode of the contended resource 60 is set to the normal mode (S810: NO), the information processing unit tries to acquire the contended resource 60 by the monitor mode using the monitor control unit 410 (S820).

On the other hand, if the information processing unit has checked that the acquisition mode of the contended resource 60 is set to the priority mode (S810: YES), the information processing unit checks whether the priority right information field 310 stores anonymous state information (S830). If anonymous state information is stored therein (S830: YES), the information processing unit tries to write, in the resource information storage area 300, priority right information indicating that the information processing unit is the prioritized information processing unit 340 and resource information indicating that the information processing unit has acquired the contended resource 60, to the exclusion of the other information processing units (S840). In other words, the exclusion controller 20 sets as the prioritized information processing unit 340 the information processing unit which has acquired the contended resource 60 first, and sets as the non-prioritized information processing units 350 the other information processing units except the prioritized information processing unit 340. If the priority right information and the resource information have been successfully written (S850: YES), the information processing unit acquires the contended resource 60 (S860) to execute other process using the contended resource 60. If the information processing unit has failed to write the priority right information and the resource information (S850: NO), the information processing unit returns the process to S800.

If the priority right information field 310 does not store anonymous state information (S830: NO), the information processing unit checks whether the information processing unit is the prioritized information processing unit 340, that is, whether information for identifying the information processing unit is stored in the priority right information field 310 (S870). If the information processing unit is not the prioritized information processing unit 340 (S870: NO), the non-prioritized information processing unit 350 executes a process for removing the priority right of the prioritized information processing unit 340 (S880), and then tries to acquire the contended resource 60 by the monitor mode using the monitor control unit 410 (S890). On the other hand, if the information processing unit is the prioritized information processing unit 340 (S870: YES), the prioritized information processing unit 340 checks whether the recursive acquisition phase of the contended resource 60 has reached a limit (S900). If the recursive acquisition phase has reached the limit (S900: YES), the prioritized information processing unit 340 transitions to the aforementioned process of S880. In other words, if the recursive acquisition phase of the contended resource 60, which the prioritized information processing unit 340 is trying to newly acquire, exceeds the limit of the recursive acquisition (e.g. the state of FIG. 11C") capable of being counted by using the recursive acquisition phase field 320 having a predetermined data size, the prioritized information processing unit 340 tries to acquire the contended resource 60 by the monitor mode tolerant of more phases.

If the recursive acquisition has not reached the limit (S900: YES), the prioritized information processing unit 340 executes a process for updating the resource information in the recursive acquisition phase field 320, e.g. a process for adding one to the value already stored therein. Then, the prioritized information processing unit 340 then acquires the contended resource 60 (S860) to execute other processes using the contended resource 60.

Figure 13:
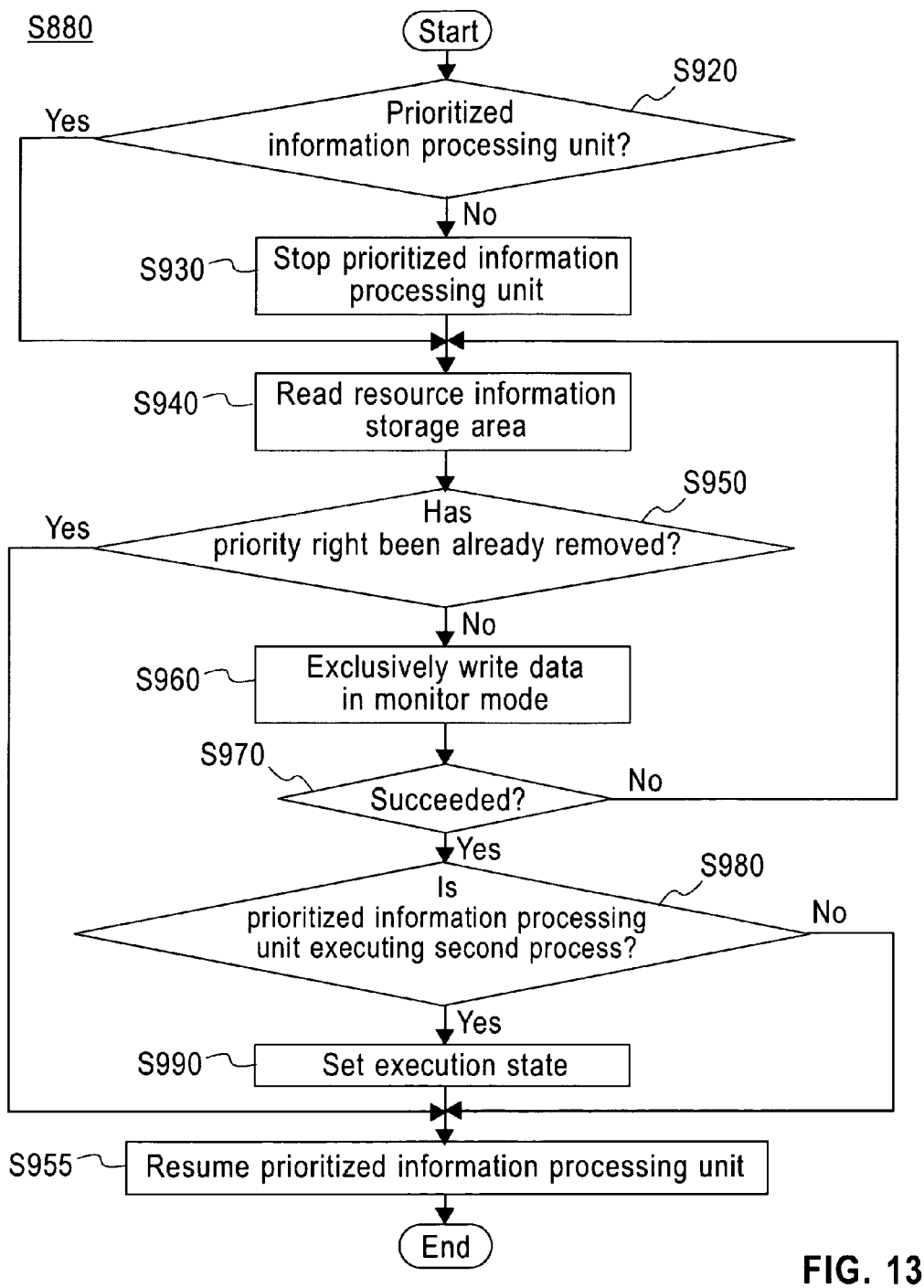
FIG. 13 is an operation flowchart showing details of S880 in FIG. 12.

FIG. 13 shows an operation flow showing details of S880 in FIG. 12. The information processing unit currently executing this flow checks whether the information processing unit is the prioritized information processing unit 340 (S920). If the information processing unit is not the prioritized information processing unit 340 (S920: NO), the information processing unit stops operations of the prioritized information processing unit 340 (S930). Subsequently, the information processing unit reads the contents of the resource information storage area 300 (S940). The information processing unit checks whether the process for removing the priority right has already been completed, based on, for example, whether the mode type information stored in the mode type field 330 indicates the normal mode (S950).

If the process for removing the priority right has already been completed (S950: YES), the information processing unit allows the prioritized information processing unit to resume operations (S955), and terminates the priority right removal process. On the other hand, if the process for removing the priority right has not been completed yet (S950: NO), the information processing unit acquires a right to access the resource information storage area 300 to the exclusion of the other information processing units, and writes data necessary for a process for acquiring the contended resource 60 by the monitor mode, in the priority right information field 310 and the recursive acquisition phase field 320 (S960). If the writing has failed (S970: NO), the information processing unit returns to S940. If the writing has succeeded (S970: YES), the information processing unit checks whether the prioritized information processing unit 340 is executing the second process (S980).

If the prioritized information processing unit 340 is executing the second process (S980: YES), the execution state setting unit 400 sets the execution state of the prioritized information processing unit 340 to the state where the prioritized information processing unit 340 is not acquiring the contended resource 60 by using the second process (S990). For example, if the prioritized information processing unit 340 is executing a process which starts with reading resource information at S800 of FIG. 12, is followed by sequentially executing S830, S870 and S900, and ends with writing resource information at S910, the execution state setting unit 400 sets the execution state of the prioritized information processing unit 340 to the state before S800 is executed. Similarly, if the prioritized information processing unit 340 is executing a process which starts with reading the resource information storage area 300 at S997 of FIG. 14 to be described later and ends with completing the release of the contended resource at S1010, the execution state setting unit 400 sets the execution state of the prioritized information processing unit 340 to the state before S997 is executed.

Figure 14:
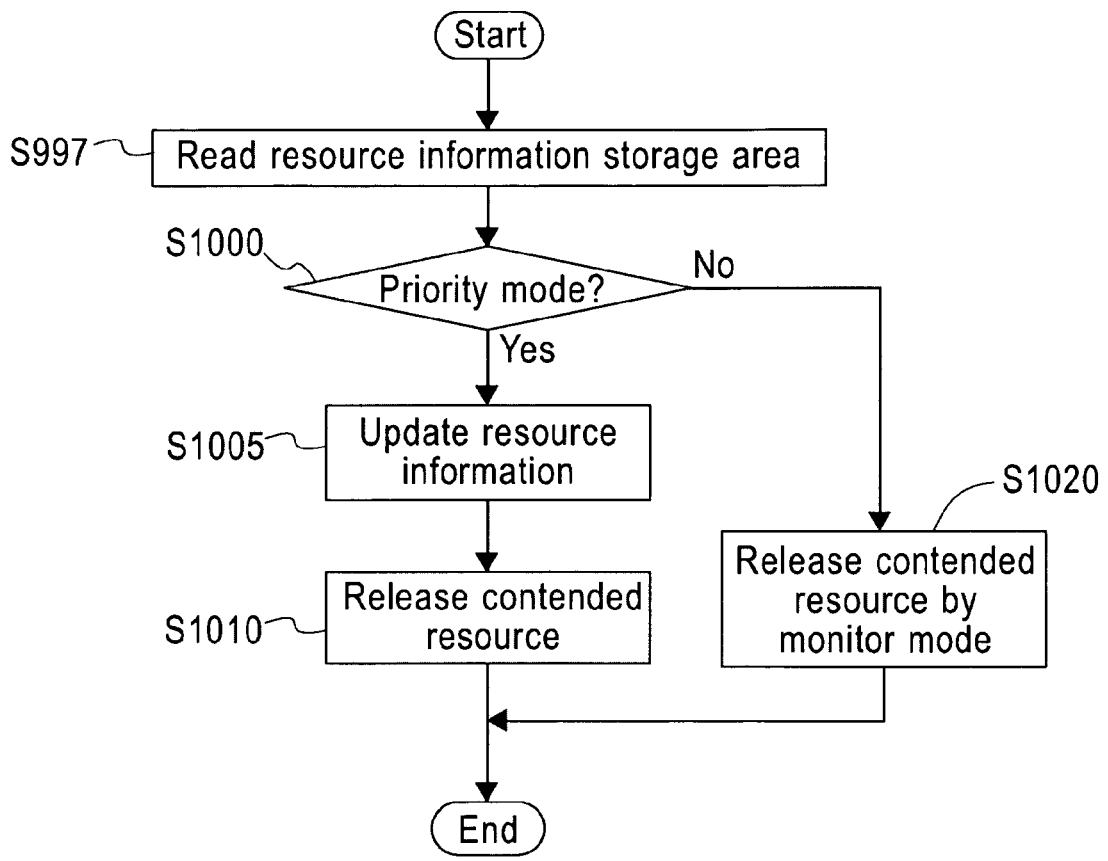
FIG. 14 is an operation flowchart where the prioritized information processing unit 340 or the non-prioritized information processing unit 350 releases the contended resource in the second embodiment.

FIG. 14 shows an operation flow where the prioritized information processing unit 340 or the non-prioritized information processing unit 350 releases the contended resource in the second embodiment. In this drawing, since the respective operations of the prioritized information processing unit 340 and the non-prioritized information processing unit 350 will be collectively described, the prioritized information processing unit 340 and the non-prioritized information processing unit 350 are generically referred to as information processing units. When an information processing unit receives directions to release the contended resource 60, the information processing unit first reads the contents of the resource information storage area 300 (S997), and refers to the mode type field 330, thereby deciding whether the acquisition mode of the contended resource 60 is set to the normal mode (S1000).

If the acquisition mode is set to the priority mode (S1000: YES), the information processing unit updates resource information by a process for subtracting one from the value in the recursive acquisition phase field 320 (S1005) to release the contended resource 60 (S1010). On the other hand, if the acquisition mode is set to the normal mode (S1000: NO), the information processing unit releases the contended resource 60 by the monitor mode using the monitor control unit 410 (S1020).

Modified Example

Figure 15:
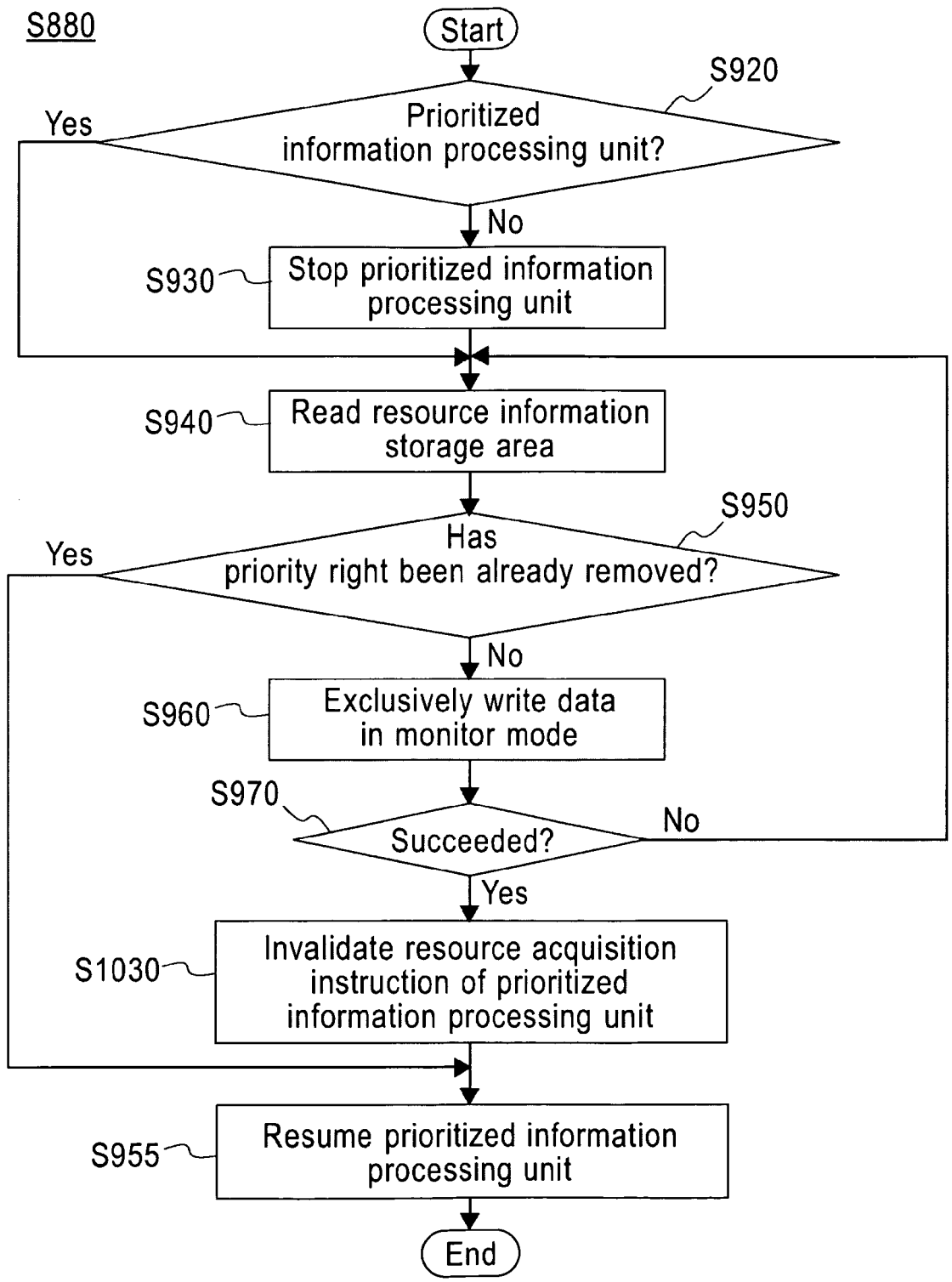
FIG. 15 is an operation flowchart showing details of S880 in a modified example of the second embodiment.

FIG. 15 shows an operation flow showing details of S880 in an modified example of the second embodiment. The operation flow described in this drawing has a configuration including S1030 instead of S980 in the operation flow described in FIG. 13.

The information processing unit writes data necessary for a process for acquiring the contended resource 60 by the monitor mode, in the priority right information field 310 and the recursive acquisition phase field 320 (S960). If the writing has succeeded (S970: YES), the information processing unit invalidates a resource acquisition instruction issued by the prioritized information processing unit 340 (S1030). The resource acquisition instruction means, for example, the operations of S910 described in FIG. 12 and S1010, i.e. a process for writing resource information in the resource information storage area in order to acquire the contended resource 60 by the prioritized information processing unit 340. Even when the prioritized information processing unit 340 is executing the second process, the information processing unit can transition to the monitor mode by invalidating the resource acquisition instruction without allowing the prioritized information processing unit 340 to acquire the contended resource 60.

Incidentally, if the information processing unit simply invalidates a resource acquisition instruction (S910) and a resource release instruction (S1010), the prioritized information processing unit 340 cannot correctly check whether the prioritized information processing unit 340 has acquired the contended resource 60 at the time when the process shown in FIG. 12 has been completed, and whether the prioritized information processing unit 340 has released the contended resource 60 at the time when the process shown in FIG. 14 has been completed. Therefore, in addition to invalidating the resource acquisition instruction, the information processing unit needs to allow the prioritized information processing unit 340 to retry the acquisition or the release of the contended resource 60. Accordingly, the exclusion controller 20 realizes the invalidation of the instruction the retrial of the acquisition of the contended resource 60 by using a conditional instruction execution function utilizing a predicate register. The conditional instruction execution function utilizing a predicate register is a function of executing an instruction only when the value of the predicate register is one. Here, the predicate register is provided so as to correspond to each instruction of a processor. In the present modified example, a predicate register 1 is previously made to correspond to the instructions to execute the processes of S910 and S1010. Predicate register 1 is previously set to one. Further, an instruction to return the process to S800 is previously provided at the location executed when S910 has been invalidated. Similarly, an instruction to return the process to S997 is previously provided at the location executed when S1010 has been invalidated. The information processing unit can return the process to S800 and S997 in addition to invalidating the resource acquisition instruction and the resource release instruction by setting predicate register 1 of the prioritized information processing unit 340 to zero.

Figure 16:
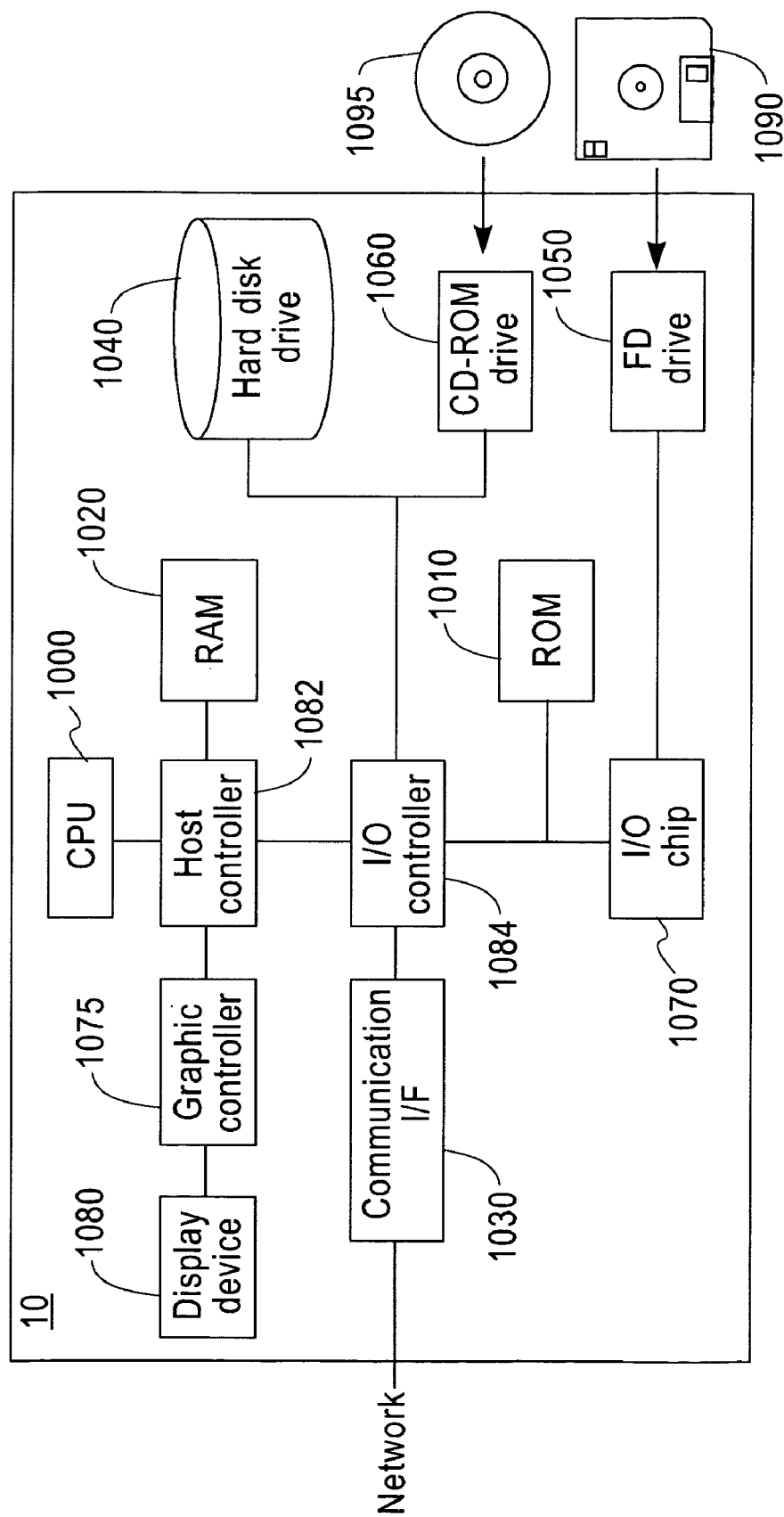
FIG. 16 is a view showing an example of the hardware configuration of the exclusion controller 10.

FIG. 16 shows an example of the hardware configuration of the exclusion controller 10. The exclusion controller 10 according to the present embodiment includes a CPU peripheral unit, an input/output unit and a legacy input/output unit. The CPU peripheral unit includes a CPU 1000, RAM 1020, a graphic controller 1075 and a display device 1080, which are mutually connected by a host controller 1082. The input/output unit includes a communication interface 1030, a hard disk drive 1040 and a CD-ROM drive 1060, which are connected to the host controller 1082 by an input/output controller 1084. The legacy input/output unit includes ROM 1010, a flexible disk drive 1050 and an input/output chip 1070, which are connected to the input/output controller 1084.

The host controller 1082 connects the RAM 1020 with the CPU 1000 and the graphic controller 1075, which access the RAM 1020 at high transfer rates. The CPU 1000 operates based on programs stored in the ROM 1010 and the RAM 1020, and controls each unit. The graphic controller 1075 acquires image data generated by the CPU 1000 or the like on a frame buffer provided in the RAM 1020, and displays the image data on the display device 1080. Instead of this, the graphic controller 1075 may include a frame buffer for storing image data generated by the CPU 1000 or the like, inside the graphic controller 1075.

The input/output controller 1084 connects the host controller 1082, the communication interface 1030, the hard disk drive 1040, the CD-ROM drive 1060 and a storage device interface 1085, which are relatively high-speed input/output devices. The communication interface 1030 communicates with other devices through a network. The hard disk drive 1040 stores programs and data used by the exclusion controller 10. The CD-ROM drive 1060 reads a program or data from a CD-ROM 1095 to provide the program the data to the RAM 1020 through the input/output controller 1084.

Moreover, the ROM 1010 and relatively low-speed input/output devices, such as the flexible disk drive 1050 and the input/output chip 1070, are connected to the input/output controller 1084. The ROM 1010 stores a boot program executed by the CPU 1000 when the exclusion controller 10 is started up, programs depending on the hardware of the exclusion controller 10, and the like. The flexible disk drive 1050 reads a program or data from a flexible disk 1090 to provide the program or the data to the RAM 1020 through the input/output controller 1084. The input/output chip 1070 is connected to the flexible disk 1090 and various input/output devices through, for example, a parallel port, a serial port, a key board port, a mouse port, and the like.

A program provided to the exclusion controller 10 is provided by a user in the state where the program is stored on a recording medium, such as the flexible disk 1090, the CD-ROM 1095, or an IC card. The program is read from the recording medium, installed in the exclusion controller 10 through the input/output controller 1084, and executed in the exclusion controller 10.

The program installed and executed in the exclusion controller 10 includes a prioritized information processing module, a non-prioritized information processing module, an acquisition check module, a prioritized information processing unit change module, a monitor control module, a full stop module. Operations which are executed by the exclusion controller 10 actuated by each module are similar to those of the corresponding members in the exclusion controller 10 described in FIGS. 1 to 9. Therefore, a description thereof will be omitted.

Incidentally, since the hardware configuration of the exclusion controller 20 is almost the same as that shown in FIG. 16, a description thereof will be omitted. A program installed and executed in the exclusion controller 20 includes a prioritized information processing module, a non-prioritized information processing module, a prioritized information processing unit stop module, a priority right removal module, a transient state check module, an execution state acquisition/notification module, an execution state setting module, and a monitor control module. Operations which are executed by the exclusion controller 20 actuated by each module are similar to those of the corresponding members in the exclusion controller 20 described in FIGS. 10 to 15. Therefore, a description thereof will be omitted.

The above-described programs and modules may be stored on an external recording medium. An optical recording medium including a DVD and a PD, a magneto-optical recording medium including an MD, a tape medium, a semiconductor memory including an IC card, and the like can be used as the recording medium, in addition to the flexible disk 1090 and the CD-ROM 1095. Moreover, a storage device, such as a hard disk drive or RAM, which is provided in a server system connected to a dedicated communication network or the Internet, may be used as the recording medium to provide a program to the exclusion controller 10 through the network.

Although the present invention has been described by using the embodiments, the technical scope of the present invention is not limited to the scope described in the aforementioned embodiments. Various modifications and improvements can be made to the aforementioned embodiments. From the appended claims, it is apparent that aspects in which such modifications and improvements are made to the embodiments can be also included in the technical scope of the present invention.

According to the previously described embodiments, a storage device, a program for controlling the storage device, a method for controlling the storage device, and a recording medium which are shown in the following respective items can be realized.

As apparent from the above description, according to the present invention, when only a specific information processing unit frequently acquires and releases a contended resource, high-speed acquisition of the contended resource is enabled while ensuring the exclusivity of acquisition of the contended resource.

Although the preferred embodiments of the present invention have been described in detail, it should be understood that various changes, substitutions and alternations can be made therein without departing from spirit and scope of the inventions as defined by the appended claims. These all solve the above-described problem with the previous art. This aspects can be achieved by combinations of features described in the appended independent claims. Moreover, the appended dependent claims specify more advantageous concrete examples of the present invention.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for managing exclusion control on an information processing system, the method comprising:
   storing a first set of information in a prioritized information processing unit information storage area, wherein the first set of information identifies a prioritized information processing unit that is to execute writes for acquiring a contended resource by using normal write instructions;
   storing a second set of information in a prioritized exclusion right information storage area, wherein the second set of information indicates whether the prioritized information processing unit is trying to acquire the contended resource;
   storing a third set of information in a non-prioritized exclusion right information storage area, wherein the third set of information is non-prioritized exclusion right information that indicates whether a non-prioritized exclusion right has been acquired by a non-prioritized information processing unit;
   mutually exclusively acquiring, by a plurality of non-prioritized information processing units, a non-prioritized exclusion right by a first process using the third set of information in the non-prioritized exclusion right information storage area;
   determining, based on mutually exclusively acquiring the non-prioritized exclusion right by the first process, that the non-prioritized exclusion right information has not yet been stored, wherein the first process executes writes by using compare-and-swap instructions, and where the non-prioritized exclusion right indicates a candidate for acquiring the contended resource; and
   acquiring, by the prioritized information processing unit, the contended resource by a second process to an exclusion of the non-prioritized information processing unit having acquired the non-prioritized exclusion right, the exclusion being determined from the non-prioritized exclusion right information storage area, updating the information in the prioritized exclusion right information storage area to indicate that the prioritized information processing unit is trying to acquire the contended resource, the second process executing writes by using normal write instructions.

2. The method of claim 1, further comprising:
   executing as the first process, by each non-prioritized information processing unit, a process for storing the non-prioritized exclusion right information indicating that the non-prioritized information processing unit has acquired the non-prioritized exclusion right, to the exclusion of the other non-prioritized information processing units if the non-prioritized exclusion right information has not yet stored, and
   executing as the second process, by the prioritized information processing unit, a process for storing the prioritized exclusion right information and then reading the non-prioritized exclusion right storage area, and acquires the contended resource if the non-prioritized exclusion right information is not stored, but does not acquire the contended resource if the non-prioritized exclusion right information has already stored.

3. The method of claim 2, further comprising:
   storing a fourth set of information in an area usage type storage area, wherein the fourth set of information indicates which of the non-prioritized exclusion right information or prioritized information processing unit information indicated by the first set of information the non-prioritized exclusion right storage area stores,
   storing, by the non-prioritized exclusion right storage area, any one of the non-prioritized exclusion right information and the first set of information indicating which of the plurality of information processing units is the prioritized information processing unit, and
   acquiring, by each of the prioritized information processing unit and the plurality of non-prioritized information processing units, the non-prioritized exclusion right by the first process if the non-prioritized exclusion right storage area stores the non-prioritized exclusion right information, and the information processing unit acquires the contended resource if the information processing unit has acquired the non-prioritized exclusion right.

4. The method of claim 2, further comprising:
   checking, by an acquisition check unit, whether the acquisition of the contended resource by any one of the first and second processes has failed; and
   executing, by a monitor control unit, exclusion control by a monitor mode in which all the information processing units waiting to acquire the contended resource are previously recorded and the information processing unit having released the contended resource notifies the information processing units waiting to acquire the contended resource that the contended resource has been released, if a check has been made that the acquisition of the contended resource has failed.

5. The method of claim 1, further comprising
   changing, by a prioritized information processing unit change unit, the prioritized information processing unit into a non-prioritized information processing unit if non-prioritized exclusion right information has been already stored, in the second process.

6. The method of claim 1, further comprising:
   storing in the prioritized information processing unit information storage area prioritized information processing unit information indicating which of the information processing units is the prioritized information processing unit; and
   allowing, by a prioritized information processing unit setting unit, any one of the plurality of information processing units to execute a process for storing, in the prioritized information processing unit information storage area, the prioritized information processing unit information indicating that the information processing unit is the prioritized information processing unit, to the exclusion of the other information processing units if the prioritized information processing unit information has not been stored.

7. The method of claim 1, further comprising:
   setting, by a prioritized information processing unit setting unit, the information processing unit having first acquired the contended resource as the prioritized information processing unit and for setting the other information processing units except the prioritized information processing unit as the non-prioritized information processing units.

8. The method of claim 1, further comprising:

storing, in a resource information storage area, resource information indicating whether the contended resource has been acquired by any one of the plurality of information processing units, while associating the resource information with priority right information indicating that the prioritized information processing unit exists; and executing, by the prioritized information processing unit, as the second process, a process for reading information from the resource information storage area and for writing the resource information in the resource information storage area if the priority right information is stored, and wherein each non-prioritized information processing unit:
stops the prioritized information processing unit;
removes the priority right information from the resource information storage area by the first process exclusively from the other information processing units after the prioritized information processing unit has been stopped;
checks whether the prioritized information processing unit which has been stopped is executing the second process; and
sets an execution state of the prioritized information processing unit to a state in which the prioritized information processing unit is not acquiring the contended resource by the second process, if a check has been made that the prioritized information processing unit is executing the second process.

9. The method of claim 8, wherein setting an execution state of the prioritized information processing unit further comprises:

setting the execution state by setting execution location information indicating an execution location of a program realizing the prioritized information processing unit to be in a state before the resource information storage area is read.

10. The method of claim 9, further comprising:

changing, by a prioritized information processing unit change unit, any one of the non-prioritized information processing units into the prioritized information processing unit.

11. The method of claim 10, further comprising:

stopping, by a full stop unit, all of the plurality of information processing units, wherein the prioritized information processing unit change unit changes the non-prioritized information processing unit having acquired the contended resource at the time when all of the plurality of information processing units are stopped, into the prioritized information processing unit.

12. The method of claim 8, further comprising:

invalidating, by the prioritized information processing unit, a process for writing in the resource information storage area in the second process.

13. The method of claim 8, further comprising:

executing, by a monitor control unit, exclusion control by a monitor mode in which all the information processing units waiting to acquire the contended resource are previously recorded and the information processing unit having released the contended resource notifies the information processing units waiting to acquire the contended resource that the contended resource has been released, if information indicating that the prioritized information processing unit does not exist has been stored in the resource information storage area.

14. An information processing system for managing exclusion control, the information processing system comprising:

a memory;
a processor communicatively coupled to the memory;
a plurality of prioritized information processing units;
a plurality of non-prioritized information processing units; and
an exclusion controller communicatively coupled to the memory and the processor, wherein the exclusion controller is adapted to:

store a first set of information in a prioritized information processing unit information storage area, wherein the first set of information identifies a prioritized information processing unit that is to execute writes for acquiring a contended resource by using normal write instructions;

store a second set of information in a prioritized exclusion right information storage area, wherein the second set of information indicates whether the prioritized information processing unit is trying to acquire the contended resource;

store a third set of information in a non-prioritized exclusion right information storage area, wherein the third set of information is non-prioritized exclusion right information that indicates whether a non-prioritized exclusion right has been acquired by a non-prioritized information processing unit;

select based on at least the second set of information and the third set of information the prioritized information processing unit over a non-prioritized information processing unit in the plurality of a non-prioritized information processing units to acquire the contended resource; and enable the prioritized information processing unit to acquire the contended resource prior to the non-prioritized information processing unit by using an acquisition process that operates at a higher speed than an acquisition process allocated to the non-prioritized information processing unit.

15. The information processing system of claim 14, wherein in response to being selected to acquire the contended resource the prioritized information processing unit:

stores information within the prioritized exclusion right storage area indicating a locked status
analyzes the-prioritized exclusion right information storage area;
determines that a non-prioritized information processing unit has stored information within the non-prioritized exclusion right information storage area; and
removing the information that has been stored within the prioritized exclusion right storage area indicating a locked status in response to determining that a non-prioritized information processing unit has stored information within the non-prioritized exclusion right information storage area.

16. A physically embodied computer readable medium for managing exclusion control, the physically embodied computer readable medium comprising instructions for:

storing a first set of information in a prioritized information processing unit information storage area, wherein the first set of information identifies a prioritized information processing unit that is to execute writes for acquiring a contended resource by using normal write instructions;

storing a second set of information in a prioritized exclusion right information storage area, wherein the second set of information indicates whether the prioritized information processing unit is trying to acquire the contended resource;

storing a third set of information in a non-prioritized exclusion right information storage area, wherein the third set of information is non-prioritized exclusion right information that indicates whether a non-prioritized exclusion right has been acquired by a non-prioritized information processing unit;

selecting based on at least the second set of information and the third set of information the prioritized information processing unit over a non-prioritized information processing unit in a plurality of non-prioritized information processing units to acquire the contended resource; and enabling the prioritized information processing unit to acquire the contended resource prior to the non-prioritized information processing unit by using an acquisition process that operates at a higher speed than an acquisition process allocated to the non-prioritized information processing unit.

* * * * *

UNITED STATES PATENT AND TRADEMARK OFFICE
CERTIFICATE OF CORRECTION

PATENT NO.        : 7,793,023 B2                              Page 1 of 1
APPLICATION NO.   : 12/062844
DATED             : September 7, 2010
INVENTOR(S)       : Kiyokuni Kawachiya et al.

It is certified that error appears in the above-identified patent and that said Letters Patent is hereby corrected as shown below:

On the cover page of the letters patent, add the following item after line (65) Prior Publication Data US 2008/0243887A1  Oct. 2, 2008

"Domestic Priority Data
Oct. 23, 2003 (US)     CON of 7,415,556"

Item (30), "Foreign Application Priority Data
Oct. 31, 2002 (JP)     2002-319006"

Col 1, l. 3 please add:

"Cross-Reference To Related Applications

This application is based upon and claims priority from prior U.S. Patent Application No. 10/691,717, filed on October 23, 2003, now U.S. Patent Number 7,415,556, the entire disclosure of which is herein incorporated by reference in its entirety.

Signed and Sealed this
Thirteenth Day of September, 2011

David J. Kappos
*Director of the United States Patent and Trademark Office*